United States Patent
Khalid et al.

(10) Patent No.: US 12,359,588 B1
(45) Date of Patent: Jul. 15, 2025

(54) AIRCRAFT ENGINE AEROMECHANICAL INSTABILITY DETECTION

(71) Applicant: General Electric Company, Cincinnati, OH (US)

(72) Inventors: Syed J. Khalid, Palm Beach Gardens, FL (US); David Marion Ostdiek, Liberty Township, OH (US); William J. Solomon, Montgomery, OH (US); Drew Michael Capps, Avon, IN (US); Stefan Joseph Cafaro, Chapel Hill, NC (US); Matthew Vincent Gettemy, Pittsburgh, PA (US); Matthew Truong, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 18/793,342

(22) Filed: Aug. 2, 2024

(51) Int. Cl.
| | | |
|---|---|---|
| *F01D 21/00* | (2006.01) | |
| *F01D 17/16* | (2006.01) | |
| *F02C 9/16* | (2006.01) | |
| *F04D 27/00* | (2006.01) | |
| *F04D 27/02* | (2006.01) | |

(Continued)

(52) U.S. Cl.
CPC ........... *F01D 21/003* (2013.01); *F01D 17/16* (2013.01); *F02C 9/16* (2013.01); *F04D 27/001* (2013.01); *F04D 27/0246* (2013.01); *F04D 29/668* (2013.01); *F05D 2270/10* (2013.01); *F05D 2270/334* (2013.01); *G01M 15/14* (2013.01)

(58) Field of Classification Search
CPC ...... F01D 21/003; F01D 17/16; F01D 17/162; F01D 17/165; F02C 9/16; F02C 9/20; F02C 9/22; F05D 2270/10; F05D 2270/101; F05D 2270/334; G01M 15/14; F04D 27/001; F04D 27/0246; F04D 29/668
See application file for complete search history.

(56) References Cited

U.S. PATENT DOCUMENTS

| | | | |
|---|---|---|---|
| 1,186,066 A | | 6/1916 | Bache |
| 4,130,872 A | * | 12/1978 | Haloff ................... G01M 15/00 701/100 |

(Continued)

FOREIGN PATENT DOCUMENTS

| | | |
|---|---|---|
| CN | 104732060 | 6/2015 |
| CN | 109883389 | 6/2019 |

(Continued)

*Primary Examiner* — Loren C Edwards
(74) *Attorney, Agent, or Firm* — Smith Gambrell & Russell LLP

(57) ABSTRACT

An engine for aeromechanical instability abatement includes a sensor configured to capture data from rotating blades of the engine system, a airflow effector device, and an engine controller. The engine controller is configured to control the airflow effector device according to a nominal schedule, detect, based on a signal from the sensor indicating a vibration amplitude of the rotating blades within a frequency band, an incipient instability condition, in response to the incipient instability condition being present, determine a modified control parameter for at least one of the airflow effector device, and control the airflow effector device according to the modified control parameter, deviating from the nominal schedule.

18 Claims, 10 Drawing Sheets

(51) Int. Cl.
*F04D 29/66* (2006.01)
*G01M 15/14* (2006.01)

(56) References Cited

U.S. PATENT DOCUMENTS

| | | | |
|---|---|---|---|
| 4,413,519 A * | 11/1983 | Bannister | G01H 1/006 |
| | | | 73/659 |
| 5,915,917 A | 6/1999 | Eveker | |
| 6,427,518 B1 | 8/2002 | Miekley | |
| 6,768,938 B2 | 7/2004 | McBrien | |
| 8,287,237 B2 | 10/2012 | Stamps | |
| 8,831,855 B2 | 9/2014 | Masse | |
| 9,528,385 B2 | 12/2016 | Payne | |
| 9,638,053 B2 | 5/2017 | Kubel | |
| 11,420,772 B2 | 8/2022 | Tomescu | |
| 11,479,350 B2 | 10/2022 | Knoll | |
| 11,525,432 B2 | 12/2022 | Von Aswege | |
| 11,898,453 B1 | 2/2024 | Yang | |
| 2010/0232963 A1 | 9/2010 | Volanthen | |
| 2011/0135474 A1 | 6/2011 | Thulke | |
| 2012/0110980 A1* | 5/2012 | Grabowski | F04D 29/563 |
| | | | 60/226.1 |
| 2014/0365153 A1 | 12/2014 | Wallin | |
| 2016/0319837 A1* | 11/2016 | Morris | F04D 29/362 |
| 2017/0167930 A1 | 6/2017 | Salm | |
| 2019/0017386 A1* | 1/2019 | Malmborg | F04D 29/388 |
| 2022/0349318 A1 | 11/2022 | Nowoisky | |
| 2023/0066572 A1* | 3/2023 | Hall | F01D 25/04 |
| 2023/0103781 A1 | 4/2023 | Bechhoefer | |

FOREIGN PATENT DOCUMENTS

| | | |
|---|---|---|
| FR | 3127024 | 3/2023 |
| FR | 3127025 | 3/2023 |
| FR | 3127269 | 3/2023 |
| FR | 3129375 | 5/2023 |
| FR | 3129428 | 5/2023 |
| FR | 3129432 | 5/2023 |
| FR | 3129436 | 5/2023 |
| FR | 3129690 | 6/2023 |
| FR | 3129970 | 6/2023 |
| FR | 3129972 | 6/2023 |
| FR | 3130313 | 6/2023 |
| FR | 3130323 | 6/2023 |
| FR | 3130747 | 6/2023 |
| FR | 3130874 | 6/2023 |
| FR | 3130875 | 6/2023 |
| FR | 3130877 | 6/2023 |
| FR | 3130879 | 6/2023 |
| FR | 3130894 | 6/2023 |
| FR | 3130895 | 6/2023 |
| FR | 3130896 | 6/2023 |
| FR | 3130897 | 6/2023 |
| FR | 3132279 | 8/2023 |
| FR | 3132729 | 8/2023 |
| FR | 3132743 | 8/2023 |
| FR | 3133367 | 9/2023 |
| FR | 3133368 | 9/2023 |

* cited by examiner

| ND | 1-4 (Spacing = 3) | 1-10 (Spacing =9) | 4-10 (Spacing = 6) | 1-11 (Spacing = 10) |
|---|---|---|---|---|
| 1 | 54 | 162 | 108 | 180 |
| 2 | 108 | 324 | 216 | 0 |
| 3 | 162 | 126 | 324 | 180 |
| 4 | 216 | 288 | 72 | 0 |
| 5 | 270 | 90 | 180 | 180 |
| 6 | 324 | 252 | 288 | 0 |
| 7 | 18 | 54 | 36 | 180 |
| 8 | 72 | 216 | 144 | 0 |
| 9 | 126 | 18 | 252 | 180 |
| 10 | 180 | 180 | 0 | 0 |

FIG. 11

AIRCRAFT ENGINE AEROMECHANICAL INSTABILITY DETECTION

FIELD OF THE DISCLOSURE

The present subject matter relates generally to aircraft engines, and specifically to aeromechanical instability detection and abatement.

BACKGROUND

Turbine engines often include variable pitch blades, which can be adjusted to affect engine output and fuel consumption. However, variable pitch blades are susceptible to aeromechanical instabilities, such as flutter, which can pose significant structural and safety risks.

BRIEF DESCRIPTION OF THE DRAWINGS

A full and enabling description of the present disclosure, including the best mode thereof, directed to one of ordinary skill in the art, is set forth in the specification, which makes reference to the appended figures, in which:

FIG. 11 is a chart providing examples of nodal diameter and sensor spacing in accordance with some embodiments.

DETAILED DESCRIPTION

Figure 1:
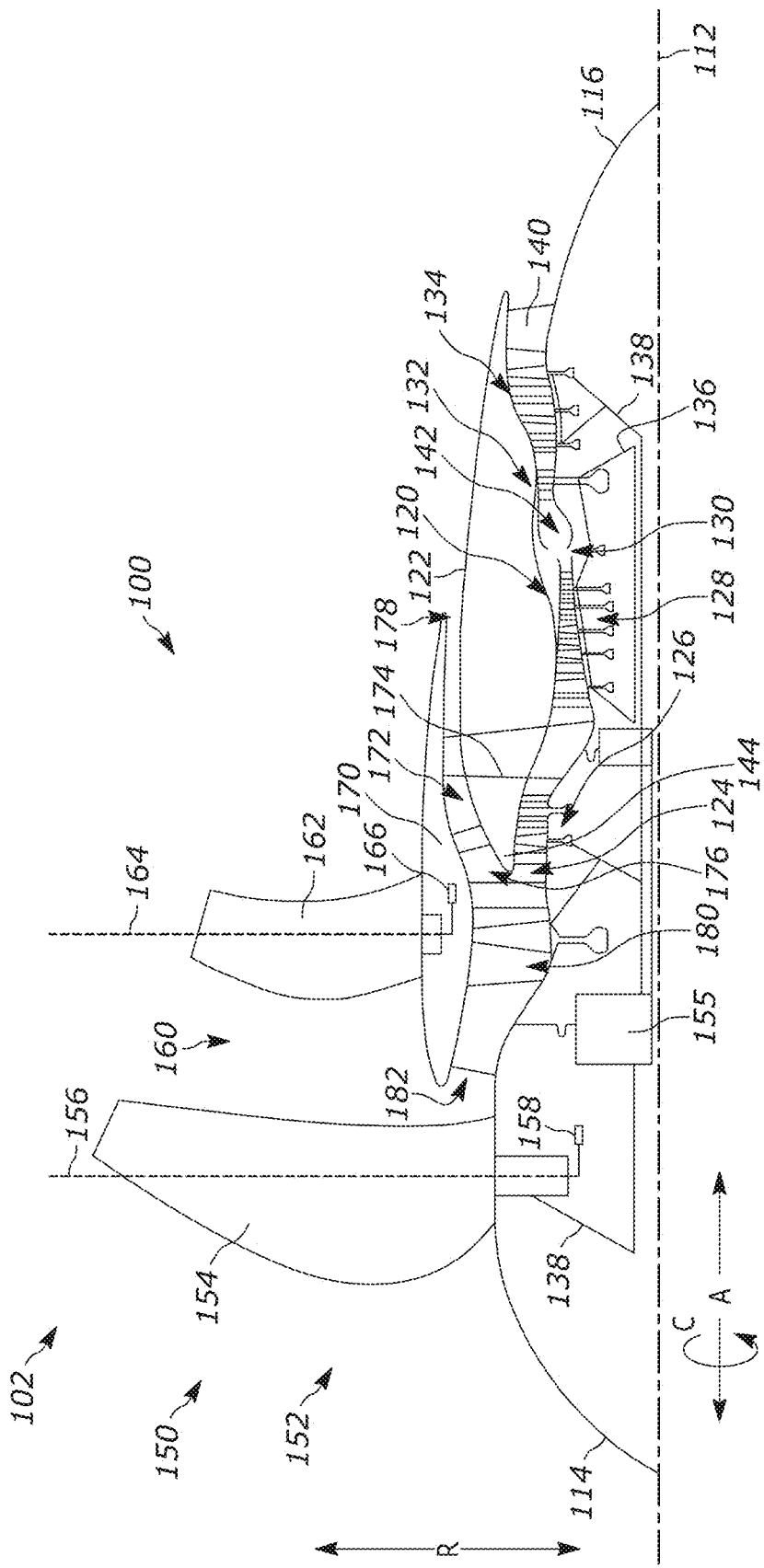
FIG. 1 is a cross-sectional side view of an embodiment of a propulsion system according to some embodiments.

Reference now will be made in detail to embodiments of the present disclosure, one or more examples of which are illustrated in the drawings. Each example is provided by way of explanation of the present disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment. Thus, it is intended that the present disclosure covers such modifications and variations as come within the scope of the appended claims and their equivalents.

As used herein, the terms "first," "second," "third," etc. may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural referents unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about," "approximately," "almost," and "substantially" are not to be limited to the precise value specified. In some instances, the approximating language may correspond to the precision of an instrument for measuring the value. For example, the approximating language may refer to being within a 1, 2, 4, 10, 15, or 20 percent margin. These approximating margins may apply to a single value or both endpoints defining numerical ranges, and/or the margin for ranges between endpoints. Here and throughout the specification and claims, range limitations are combined and interchanged. Such ranges are identified and include all the sub-ranges contained therein unless context or language indicates otherwise. For example, all ranges disclosed herein are inclusive of the endpoints, and the endpoints are independently combinable with each other.

In engines with variable pitch fan blades, fan pitch can be controlled to affect engine thrust. However, opening the pitch of the fan blades could reduce aeromechanics (e.g., flutter) margin. Flutter possesses significant structural and safety risks. Flutter can also be encountered if variable fan exit guide vanes or outlet guide vanes are closed from a standard position. Further, the onset of an aeromechanical problem can be highly unpredictable.

In some aspects, an engine control system with automated instability abatement is provided. The system is configured to detect, based on a signal from the sensor indicating a vibration amplitude of the rotating blades within a frequency band, an incipient instability condition, in response to the incipient instability condition being present, determine a modified control parameter for at least one of the one or more airflow effector devices, and control the at least one of the one or more airflow effector devices according to the modified control parameter, deviating from a nominal schedule of the engine system.

Referring now to FIG. 1, a schematic cross-sectional view of a gas turbine engine 100 is provided according to an example embodiment of the present disclosure. It will be appreciated, however, that the exemplary single rotor unducted engine 100 depicted in FIG. 1 is by way of example only, and that in other exemplary embodiments, the engine 100 may have any other suitable configuration, including, for example, any other suitable number of shafts or spools, turbines, compressors, etc.; fixed-pitch blades, a direct-drive configuration (i.e., may not include the gearbox 155); etc. For example, in other exemplary embodiments, the engine 100 may be a three-spool engine, having an intermediate speed compressor and/or turbine. In such a configuration, it will be appreciated that the terms "high" and "low," as used herein with respect to the speed and/or pressure of a turbine, compressor, or spool are terms of convenience to differentiate between the components, but do not require any specific relative speeds and/or pressures, and are not exclusive of additional compressors, turbines, and/or spools or shafts.

Additionally, or alternatively, in other exemplary embodiments, any other suitable gas turbine engine may be provided. For example, in other exemplary embodiments, the gas turbine engine may be a turboshaft engine, a turboprop engine, a turbojet engine, a rotorcraft engine, a ducted engine with variable pitch blades, etc. Moreover, for example, although the engine is depicted as a single unducted rotor engine, in other embodiments, the engine may include a multi-stage open rotor configuration or a ducted engine, and aspects of the disclosure described herein below may be incorporated therein. Furthermore, the engine may be an internal combustion engine or an electrically driven propulsor engine.

FIG. 1 provides an engine 100 having a rotor assembly with a single stage of unducted rotor blades. In such a manner, the rotor assembly may be referred to herein as an "unducted fan," or the entire gas turbine engine 100 may be referred to as an "unducted engine," or an engine having an open rotor propulsion system 102. In addition, the engine of FIG. 1 includes a mid-fan stream extending from the compressor section to a rotor assembly flowpath over the turbomachine, as will be explained in more detail below. It is also contemplated that, in other exemplary embodiments, the present disclosure is compatible with an engine having a duct around the unducted fan. It is also contemplated that, in other exemplary embodiments, the present disclosure is compatible with a turbofan engine having a third stream as described herein.

For reference, the gas turbine engine 100 defines an axial direction A, a radial direction R, and a circumferential direction C. Moreover, the gas turbine engine 100 defines an axial centerline or longitudinal axis 112 that extends along the axial direction A. In general, the axial direction A extends parallel to the longitudinal axis 112, the radial direction R extends outward from and inward to the longitudinal axis 112 in a direction orthogonal to the axial direction A, and the circumferential direction extends three hundred sixty degrees (360°) around the longitudinal axis 112. The gas turbine engine 100 extends between a forward end 114 and an aft end 116, e.g., along the axial direction A.

The gas turbine engine 100 includes a turbomachine 120, also referred to as a core of the gas turbine engine 100, and a rotor assembly, also referred to as a fan section 150, positioned upstream thereof. Generally, the turbomachine 120 includes, in serial flow order, a compressor section, a combustion section, a turbine section, and an exhaust section. Particularly, as shown in FIG. 1, the turbomachine 120 includes a core cowl 122 that defines an annular core inlet 124. The core cowl 122 further encloses at least in part a low pressure system and a high pressure system. For example, the core cowl 122 depicted encloses and supports at least in part a booster or low pressure ("LP") compressor 126 for pressurizing the air that enters the turbomachine 120 through core inlet 124. A high pressure ("HP"), multi-stage, axial-flow compressor 128 receives pressurized air from the LP compressor 126 and further increases the pressure of the air. The pressurized air stream flows downstream to a combustor 130 of the combustion section where fuel is injected into the pressurized air stream and ignited to raise the temperature and energy level of the pressurized air and produce high energy combustion products.

It will be appreciated that as used herein, the terms "high/low speed" and "high/low pressure" are used with respect to the high pressure/high speed system and low pressure/low speed system interchangeably. Further, it will be appreciated that the terms "high" and "low" are used in this same context to distinguish the two systems, and are not meant to imply any absolute speed and/or pressure values.

The high energy combustion products flow from the combustor 130 downstream to a high pressure turbine 132. The high pressure turbine 132 drives the high pressure compressor 128 through a high pressure shaft 136. In this regard, the high pressure turbine 132 is drivingly coupled with the high pressure compressor 128. The high energy combustion products then flow to a low pressure turbine 134. The low pressure turbine 134 drives the low pressure compressor 126 and components of the fan section 150 through a low pressure shaft 138. In this regard, the low pressure turbine 134 is drivingly coupled with the low pressure compressor 126 and components of the fan section 150. The LP shaft 138 is coaxial with the HP shaft 136 in this example embodiment. After driving each of the turbines 132, 134, the combustion products exit the turbomachine 120 through a core or turbomachine exhaust nozzle 140.

Accordingly, the turbomachine 120 defines a working gas flowpath or core duct 142 that extends between the core inlet 124 and the turbomachine exhaust nozzle 140. The core duct 142 is an annular duct positioned generally inward of the core cowl 122 along the radial direction R. The core duct 142 (e.g., the working gas flowpath through the turbomachine 120) may be referred to as a second stream.

The fan section 150 includes a fan 152, which is the primary fan in this example embodiment. For the depicted embodiment of FIG. 1, the fan 152 is an open rotor or unducted fan 152. As depicted, the fan 152 includes an array of fan blades 154. The fan blades 154 are rotatable, e.g., about the longitudinal axis 112. In FIG. 1, the fan 152 is drivingly coupled with the low pressure turbine 134 via the LP shaft 138. The fan 152 can be directly coupled with the LP shaft 138, e.g., in a direct-drive configuration. However, for the embodiments shown in FIG. 1, the fan 152 is coupled with the LP shaft 138 via a speed reduction gearbox 155, e.g., in an indirect-drive or geared-drive configuration.

Moreover, the fan blades 154 can be arranged in equal spacing around the longitudinal axis 112. Each fan blade 154 has a root and a tip and a span defined therebetween. Each fan blade 154 defines a central blade axis 156. For this embodiment, each fan blade 154 of the fan 152 is rotatable about their respective central blade axis 156, e.g., in unison with one another. One or more actuators 158 are provided to facilitate such rotation and therefore may be used to change a pitch of the fan blades 154 about their respective central blade axis 156.

The fan section 150 further includes a fan guide vane array 160 that includes fan guide vanes 162 (only one shown in FIG. 1) disposed around the longitudinal axis 112. For this embodiment, the fan guide vanes 162 are not rotatable about the longitudinal axis 112. Each fan guide vane 162 has a root and a tip and a span defined therebetween. The fan guide vanes 162 may be unshrouded as shown in FIG. 1 or, alternatively, may be shrouded, e.g., by an annular shroud spaced outward from the tips of the fan guide vanes 162 along the radial direction R or attached to the fan guide vanes 162.

Each fan guide vane 162 defines a central blade axis 164. For this embodiment, each fan guide vane 162 of the fan guide vane array 160 is rotatable about their respective central blade axis 164, e.g., in unison with one another. One or more actuators 166 are provided to facilitate such rotation and therefore may be used to change a pitch of the fan guide vane 162 about their respective central blade axis 164.

However, in other embodiments, each fan guide vane 162 may be fixed or unable to be pitched about its central blade axis 164. The fan guide vanes 162 are mounted to a fan cowl 170.

As shown in FIG. 1, in addition to the fan 152, which is unducted, a ducted fan 184 is included aft of the fan 152, such that the gas turbine engine 100 includes both a ducted and an unducted fan which both serve to generate thrust through the movement of air without passage through at least a portion of the turbomachine 120 (e.g., the HP compressor 128 and combustion section for the embodiment depicted). The ducted fan 184 may be at about the same axial location as the fan blade 154 or the vanes 162, and radially inward of the fan blade 154 or the vanes 162. The ducted fan 184, for the embodiment depicted, is driven by the low pressure turbine 134 (e.g., coupled to the LP shaft 138).

The fan cowl 170 annularly encases at least a portion of the core cowl 122 and is generally positioned outward of at least a portion of the core cowl 122 along the radial direction R. Particularly, a downstream section of the fan cowl 170 extends over a forward portion of the core cowl 122 to define a fan flow path or fan duct 172. The fan flowpath or fan duct 172 may be referred to as a third stream of the gas turbine engine 100.

Incoming air may enter through the fan duct 172 through a fan duct inlet 176 and may exit through a fan exhaust nozzle 178 to produce propulsive thrust. The fan duct 172 is an annular duct positioned generally outward of the core duct 142 along the radial direction R. The fan cowl 170 and the core cowl 122 are connected together and supported by a plurality of substantially radially-extending, circumferentially-spaced stationary struts 174 (only one shown in FIG. 1). The stationary struts 174 may each be aerodynamically contoured to direct air flowing thereby. Other struts in addition to the stationary struts 174 may be used to connect and support the fan cowl 170 and/or core cowl 122. In many embodiments, the fan duct 172 and the core duct 142 may at least partially co-extend (generally axially) on opposite sides (e.g., opposite radial sides) of the core cowl 122. For example, the fan duct 172 and the core duct 142 may each extend directly from a leading edge 144 of the core cowl 122 and may partially co-extend generally axially on opposite radial sides of the core cowl.

The gas turbine engine 100 also defines or includes an inlet duct 180. The inlet duct 180 extends between an engine inlet 182 and the core inlet 124/fan duct inlet 176. The engine inlet 182 is defined generally at the forward end of the fan cowl 170 and is positioned between the fan 152 and the fan guide vane array 160 along the axial direction A. The inlet duct 180 is an annular duct that is positioned inward of the fan cowl 170 along the radial direction R. Air flowing downstream along the inlet duct 180 is split, not necessarily evenly, into the core duct 142 and the fan duct 172 by a splitter or leading edge 144 of the core cowl 122. The inlet duct 180 is wider than the core duct 142 along the radial direction R. The inlet duct 180 is also wider than the fan duct 172 along the radial direction R.

Figure 2:
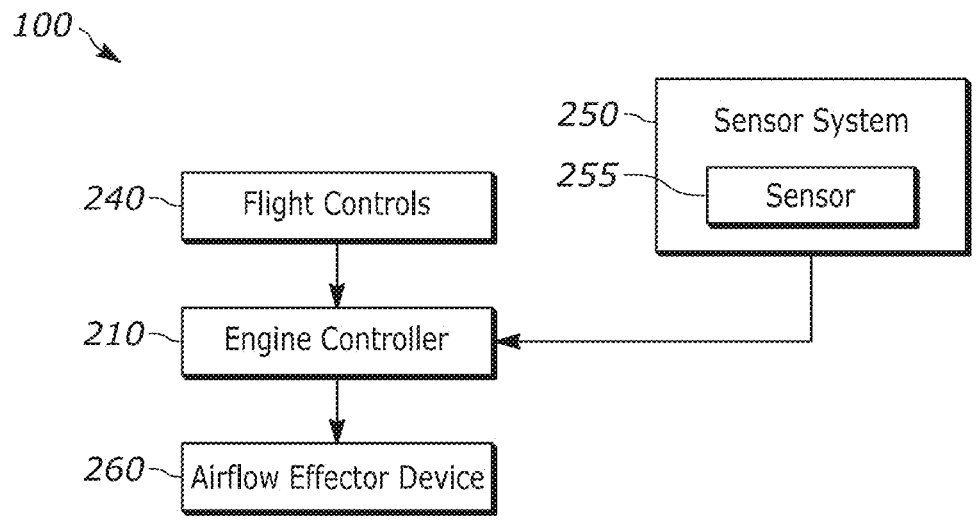
FIG. 2 is a simplified block diagram of an engine control system according to some embodiments.

Next referring to FIG. 2, a block diagram of an engine 100 is shown. The engine 100 includes an engine controller 210 configured to receive input from flight controls 240 and a sensor system 250 and control one or more airflow effector devices 260. In some embodiments, the engine controller 210 is a processor-based control system of an engine, such as a full authorization digital engine control ("FADEC") of the engine 100. In some embodiments, the engine controller 210 may include the FADEC and one or more aeromechanical instability detection modules implemented as a software module of the FADEC or a separate hardware module. Operations of the engine controller 210 are described in more detail with reference to FIGS. 3-12 herein.

In some embodiments, the flight controls 240 is an aircraft controller, an autothrottle system, and/or other pilot-operated inputs. In some embodiments, the flight controls 240 may set and change a target engine parameter during various phases of flight. In some embodiments, the target engine parameter includes target thrust output, speed, torque, power pressure, and/or pressure ratio. In some embodiments, the engine controller 210 may determine a nominal schedule for operating various components of the engine 100 based on signals received from the flight controls 240.

In some embodiments, the sensor system 250 may include one or more sensors 255 for measuring environmental, flight, and/or engine conditions. In some embodiments, the sensor system 250 may include one or more vibration sensors positioned to detect vibration magnitudes and frequencies from one or more blades of a rotor of the engine 100. For example, the sensor system 250 may include sensors 255 positioned for capturing data from one or more portions of fan blades 154. In some embodiments, the sensor 255 includes an optical sensor, a pressure transducer sensor, a strain gauge, an accelerometer, and/or a torque meter for detecting oscillation frequencies. In some embodiments, the sensor 255 includes a blade pass sensor for detecting times or arrival of blades. In some embodiments, a blade pass sensor may include an optical sensor, a capacitance sensor, and/or an eddy current sensor. In some embodiments, the sensor 255 is mounted on a static portion of the engine for capturing data from rotating blades. In some embodiments, the sensor 255 includes a rotating sensor that is mounted on and rotates with the rotating blades of the engine 100.

The airflow effector device 260 may include one or more engine components configured to affect airflow around the engine 100. In some embodiments, one or more airflow effector devices 260 may include variable geometry devices with geometry (e.g., pitch, roll, yaw, etc.) that can be physically manipulated by an actuator to affect airflow. In some embodiments, one or more airflow effector devices 260 may be a fan speed effector such as fuel injector and electric motor. In some embodiments, the one or more airflow effector devices 260 may include one or more of a plurality of variable pitch blades, a fuel injector, a plurality of variable stator vanes, a plurality of inlet guide vanes, a plurality of outlet guide vanes, a variable nozzle, or an electric motor. FIG. 2 is only a simplified block diagram, in some embodiments, the engine controller 210 is further configured to control other engine components aside from the one or more airflow effector devices 260. In some embodiments, the engine controller 210 which is coupled to the sensor array 1000 described with reference to FIG. 10 and configured to determine frequencies and phases of the vibrations of the two or more airfoils based on signals from the sensor array 1000 to detect an incipient instability condition.

Figure 3:
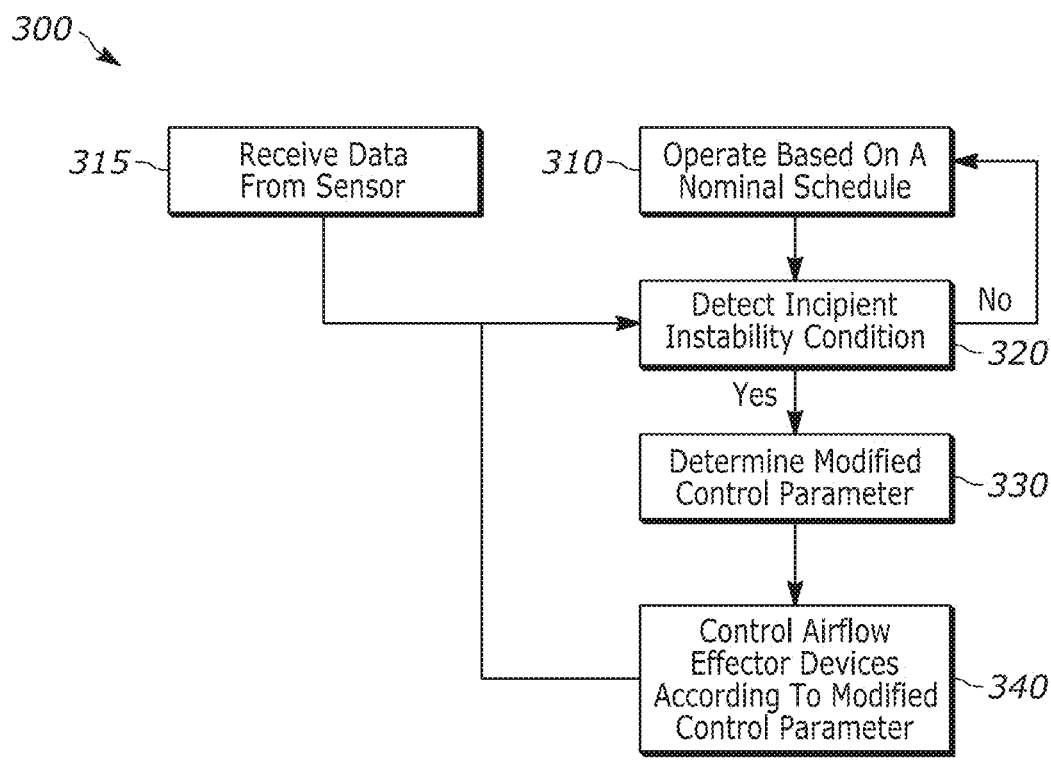
FIG. 3 is a flow diagram of a method for instability abatement according to some embodiments.

Next referring to FIG. 3, a method for controlling an engine for instability abatement is shown. In some embodiments, one or more steps of FIG. 3 are performed with a processor-based control system of an engine such as the engine controller 210 of the engine 100.

In step 310, the engine 100 is operated based on a nominal schedule. As used herein, the nominal schedule refers to a predefined and stored set of operational parameters and/or limits that dictates the engine's behavior such as fan speed, nozzle size, electric machine output, variable blade pitch, variable vane pitch, etc. In some embodiments, the nominal schedule is stored on and retrieved from an on-board memory of the engine 100. In some embodiments, the engine controller 210 is configured to select control parameters according to the nominal schedule based on flight control inputs received from an aircraft controller such as flight controls 240. In some embodiments, the nominal schedule defines the control parameters based on a target thrust determined based on an engine command from an aircraft controller in communication with the FADEC of the engine, such as the flight controls 240 in communication with engine controller 210. In some embodiments, the nominal schedule is a schedule according to a conventional engine control scheme where sequences of operation parameters to achieve a target engine output is determined based on prior testing/configuration and stored on an on-board memory of the aircraft. In some embodiments, the nominal schedule is a standard schedule used across an engine model.

In step 315, the sensor data is received from a sensor 255 configured to capture data from rotating blades 154 of an engine 100. In some embodiments, the sensor data may be from one or more sensors 255 onboard and/or embedded on the engine 100. In some embodiments, the data may be captured by an optical sensor, a pressure transducer sensor, a strain gauge, an accelerometer, a capacitance sensor, an eddy current sensor, and/or a torque meter for detecting oscillation frequencies. In some embodiments, the sensor 255 is a blade pass sensor.

In step 320, the engine controller 210 determines whether the signal from the sensor 255 indicates an incipient instability condition. An incipient instability condition generally refers to a signal indicative of an imminent onset of an aeromechanical instability condition such as flutter in the engine. In some embodiments, the incipient instability condition indicates a possible onset of instability in seconds to minutes under the current operating condition. In some embodiments, the incipient instability condition can indicate a possible onset of instability in less than a second under the current operating condition. In some embodiments, an incipient instability condition is detected based on detecting a flutter signature in the signal. In some embodiments, the signal includes a vibration amplitude of the rotating blades within a frequency band and the incipient instability condition is detected based on an amplitude magnitude in a predetermined frequency band of the signal from the sensor exceeding a threshold value. In some embodiments, the signal is filtered by a bandpass filter to isolate the selected frequency corresponding to flutter or other aeromechanical instability. In some embodiments, the select frequency is a frequency band between 0.1-60 Hertz. In some embodiments, the select frequency may have a first mode of 500 Hz or higher. However, the frequency band may vary depending on engine configuration and/or typical operating conditions. For a rotating part, the frequency band may generally be a multiple of 0.1-20 times the redline or maximum speed of the shaft the blades are rotating on. (e.g., 0.1*RL speed<$f_{rotating}$<20*RL speed). The frequency band may vary depending on engine configuration and/or typical operating conditions. In some embodiments, the select frequency for a particular engine model and/or aircraft may be determined based on simulation and/or inflight measurements and stored in a memory of the controller for use. In some embodiments, the incipient instability condition is detected based on a root mean square (RMS) value of the signal from the sensor exceeding a threshold value. In some embodiments, the gas turbine engine 100 may include an analog RMS meter for computing the RMS value and providing the RMS value to the engine controller 210 for incipient instability condition detection.

In some embodiments, the sensor 255 may be rotating or stationary. In some embodiments, the sensor 255 includes a rotating sensor such as a rotating strain gauge sensor, and the flutter signature is detected based on a response at frequency of airfoil mode $f_{rotating}$. For a sensor that is stationary relative to the rotating blades, observed flutter frequency may be shifted by the product of system mode nodal diameter (ND) and engine speed (RPM). In some embodiments, the sensor 255 includes a stationary sensor such as a Kulite sensor, an accelerometer, or a strain gauge sensor. With a stationary sensor, flutter signature may be detected based on a response at a stationary frequency ($f_{stationary}=f_{rotating}+ND*RPM$). In some embodiments, the range of stationary observed frequency may be expanded by on the possible nodal diameters+/−Nblades/2*RPM, where Nblades is the number of blades in the stage (i.e. (0.1− Nblades/2)*RL speed<$f_{stationary}$< (20+Nblades/2)*RL speed). In some embodiments, the sensor 255 includes a blade pass sensor such as an optical sensor, a capacitance sensor, an eddy current sensor, etc. With a blade pass sensor, flutter signature may be detected based on performing Fast Fourier Transformation (FFT) of blade time of arrival to look for the content at a stationary frequency based on (($f_{stationary}=f_{rotating}+ND*RPM$).

If incipient instability condition is not detected, the engine controller 210 continues to operate the engine according to the nominal schedule in step 310. If an incipient instability condition is detected, in step 330, the engine controller 210 determines modified control parameters for one or more airflow effector devices 260. In some embodiments, the engine controller 210 may modify the operations of one, two, three, or more types of airflow effector devices 260 in response to detecting an incipient instability condition. In some embodiments, airflow effecter devices 260 may include variable pitch blades, variable pitch inlet guide vanes, variable pitch outlet guide vanes, and fan speed effectors. In some embodiments, variable pitch blades and vanes may collectively be referred to as variable geometries of the engine 100.

In some embodiments, in response to detecting the incipient instability condition, the engine controller 210 is configured to incrementally close a pitch angle of one or more rotating blades or stationary guide vanes of the engine system. The closing of the pitch angle may continue until the incipient instability condition is no longer detected (e.g., the vibration magnitude detected by the sensor 255 falls below a threshold).

In some embodiments, the gas turbine engine 100 includes a memory storage device storing a control parameter table storing modified control parameters corresponding to one or more engine parameters, wherein the modified control parameter is determined based on the control parameter table. The engine parameters may include a target thrust, a target speed, control parameters of the nominal schedule, and/or signals from one or more engine, flight, or environmental sensors. The modified control parameters may include one or more of blade pitch angle, inlet guide vane pitch angle, outlet guide vane pitch angle, fan speed, etc. For example, when an incipient instability condition is detected, a combination of control and measured variables may be used to retrieve the corresponding instability abatement control parameters from the table.

In some embodiments, the gas turbine engine 100 includes a memory storage device storing an engine model, wherein the modified control parameter is selected from candidate control parameters using the engine model to predict thrust for each set of candidate control parameters. In some embodiments, the engine model store sets of control and/or environment parameters and corresponding predicted thrusts. In some embodiments, the engine model may include one or more equations that may be used to predict thrust at a given control and/or environmental parameters. In some embodiments, the engine controller 210 may select a set of candidate control parameters that would abate the instability condition based on a lookup table and/or the nominal schedule. In some embodiments, the candidate control parameter sets are selected based on control and/or sensor signals received at the engine controller 210. The candidate control parameters are then tested against the engine model to select a candidate set that has the least amount of impact on the thrust of the engine (e.g., maintains thrust, least reduction in thrust).

In some embodiments, airflow effector devices 260 include a blade pitch change mechanism configured to change pitch angles of the rotating blades of the engine system, such as actuator 158, and the modified control parameter includes a change in the pitch angles of one or more of the rotating blades. In some embodiments, the modified control parameter changes the pitch angles of only a subset of the rotating blades while others of the rotating blades are pitched according to the nominal schedule.

In some embodiments, the airflow effector devices 260 include one or more vane pitch changing mechanisms, such as actuators 166, configured to change pitch angles of inlet guide vanes and/or outlet guide vanes, and the modified control parameter includes a change in the pitch angles of one or more of the vanes. In some embodiments, the modified control parameter changes the pitch angles of only a subset of the outlet guide vanes while others of the vanes are pitched according to the nominal schedule. For example, the modified control parameter may change the pitch angle by 1-10, or more degrees.

In some embodiments, the airflow effector devices 260 include a fuel injector and/or an electric fan motor, and the modified control parameters include a modified blade rotation speed, which may be affected by fuel injection rate and/or an electric motor output.

In step 340, the engine controller 210 controls one or more airflow effector devices 260 according to the modified control parameter, deviating from the nominal schedule of step 310. For example, the engine controller 210 may change the pitch of one or more fan blades and/or one or more vanes in step 340. In another example, the engine controller 210 may change the fan speed via fuel controls or electric motor controls. In some embodiments, the modified control parameter is executed as an adjustment or increment of the nominal schedule. In some embodiments, other engine components (e.g., fuel, electric motor) are controlled to compensate for the effect of the modified airflow effector devices on thrust. For example, when fan pitch is closed, fan speed may be increased via fuel control.

After step 340, the engine controller 210 may continue to capture data via the sensor 255 or determine whether the incipient instability condition has been successfully abated by the modified control parameters. In some embodiments, the termination of the incipient instability condition is determined based on whether the vibration magnitude measured by the sensor is below a termination threshold. In some embodiments, the termination threshold is the same or lower than the detection threshold used in step 320. In some embodiments, if the incipient instability condition persists, the process may return to step 320, and the engine controller 210 may determine one or more sets of subsequent modified control parameters and control the one or more airflow effector devices 260 according to the one or more sets of subsequent modified control parameters until the incipient instability condition ends. In some embodiments, when the termination threshold is reached, the engine controller 210 may continue to operate based on the modified controller parameter for a set period (e.g., seconds, minutes) to prevent the incipient instability condition from reoccurring. In some embodiments, the engine controller 210 may initiate returning the airflow effector devices 260 back to the nominal schedule by gradually returning the positions of the airflow effector devices 260 from the modified control parameters to the parameters according to the nominal schedule over a period of time (e.g., seconds, minutes) after the termination threshold has been reached.

In some embodiments, after step 340, the engine controller 210 is configured to store the modified control parameter used for instability abatement for engine health analysis. In some embodiments, modified control parameters and engine parameters from successful and/or unsuccessful instability abatements is stored as training/learning data. The control parameter table and/or the engine model may be updated based on the training/learning data with further modeling and/or machine learning. For example, the flight or engine conditions at the time of the incipient instability condition may be stored along with the modified control parameters of a successful abatement as training data.

With the process shown in FIG. 3, an engine 100 can be configured to automatically prevent/abate flutters caused by the nominal schedule and flight conditions by modifying engine controls. By implementing the method 300 on the engine controller 210, the engine can dynamically deviate from a nominal schedule to prevent flutters and reduce structural and safety risks.

Figure 4:
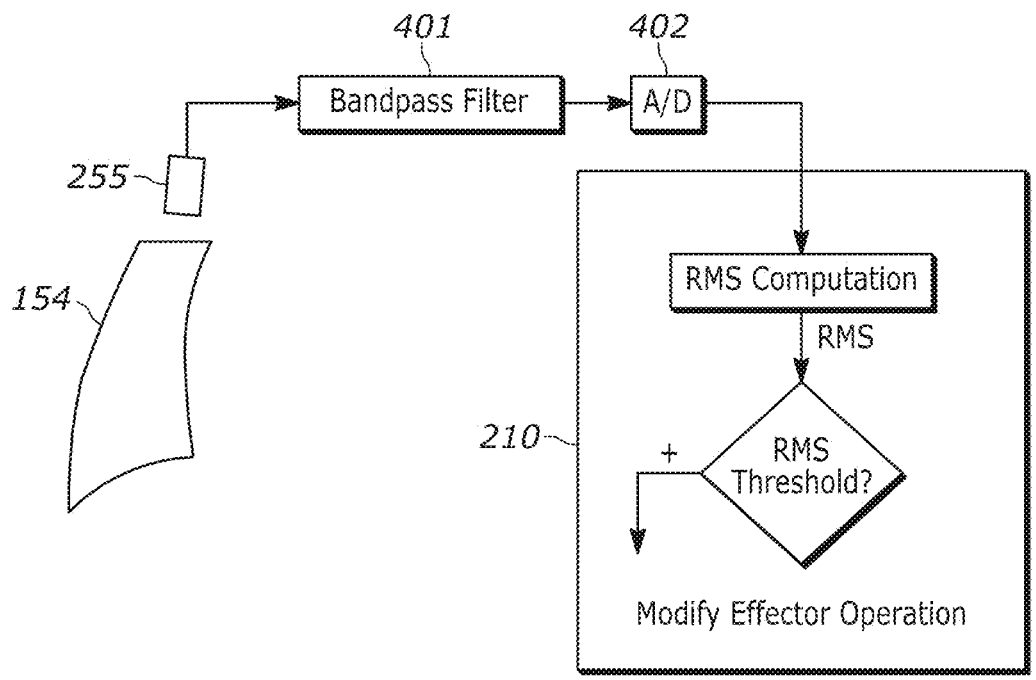
FIG. 4 is a simplified block diagram of an engine system according to some embodiments.

Next referring to FIG. 4, a simplified block diagram of an engine system according to some embodiments is shown. The engine 100 includes one or more sensors 255 positioned to capture data from fan blades 154 of an engine. In some embodiments, the sensor 255 is an optical sensor. In some embodiments, the sensor 255 comprises a stationary sensor or a rotating sensor mounted on the fan blades 154. For example, strain gauges or accelerometers may be positioned on one or more rotating blades, and signals captured by the sensor may be transmitted to the engine controller 210 via telemetry or slip rings. The signal from the sensor 255 passes through a bandpass filter 401 to select a target frequency band. The filtered signal then passes through an analog to digital (A/D) converter 402 to generate a digital signal for the engine controller 210. The engine controller 210 then performs software RMS computation on the received digital signal. If the RMS value of the signal exceeds a threshold value, the engine controller 210 is configured to control the airflow effector devices according to a modified control parameter. The threshold value may be determined based on ground or inflight measurements of normal operating conditions of the engine. In some embodiments, the thresholds may be defined as a percentage of the endurance limit, the endurance limit being a stress range that can be repeated indefinitely without material fatigue failure. In some embodiments, threshold may be 20-90% of endurance limit. The engine controller 210 may close variable pitch of the blades incrementally. For example, the controller 210 may close the variable pitch at the speed of (0.01-10 deg/sec)

While RMS values are described herein, in some embodiments, the engine controller 210 may execute a real-time Fast Fourier Transformation (FFT) algorithm or use other parameters indicative of vibration magnitude for incipient instability detection. When the signal is digitized/sampled at a high rate (e.g., at least 2× the frequency range mentioned above for $f_{rotating}$ or $f_{stationary}$), FFT provides amplitude and phase at different frequencies as input to system-mode based instability detection. With a digitized signal, a range of responses (difference between max and min response) may be used with or without a bandpass filter for stress (strain gauge (SG)), deflection (tip timing), Gs/ips/mils (accelerometers)), pressure (kulites) to quantify current magnitude.

Figure 5:
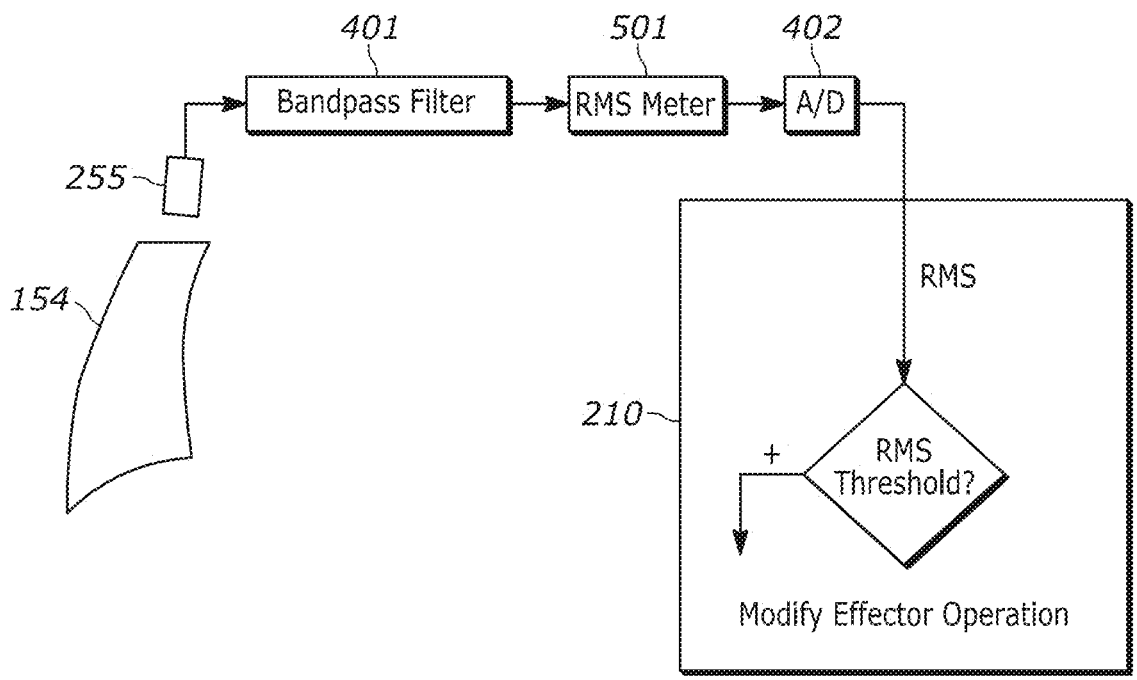
FIG. 5 is a simplified block diagram of another engine system according to some embodiments.

Next referring to FIG. 5, a simplified block diagram of an engine system according to some embodiments is shown. The embodiment shown in FIG. 5 is similar to the embodiment shown in FIG. 4, except that the engine includes an RMS meter 501 configured to generate RMS values based on the output of the bandpass filter 401. The RMS values are converted to digital signals by the converter 402. The engine controller 210 does not then perform RMS calculations and can directly use the received digital signal to determine whether the RMS value exceeds the threshold. In some embodiments, the inclusion of the RMS meter 501 reduces the computational load on the engine controller 210 by removing the need to perform software RM computations and allows for an engine controller 210 with low sampling rate to perform flutter detection with higher sampling rate.

Figure 6:
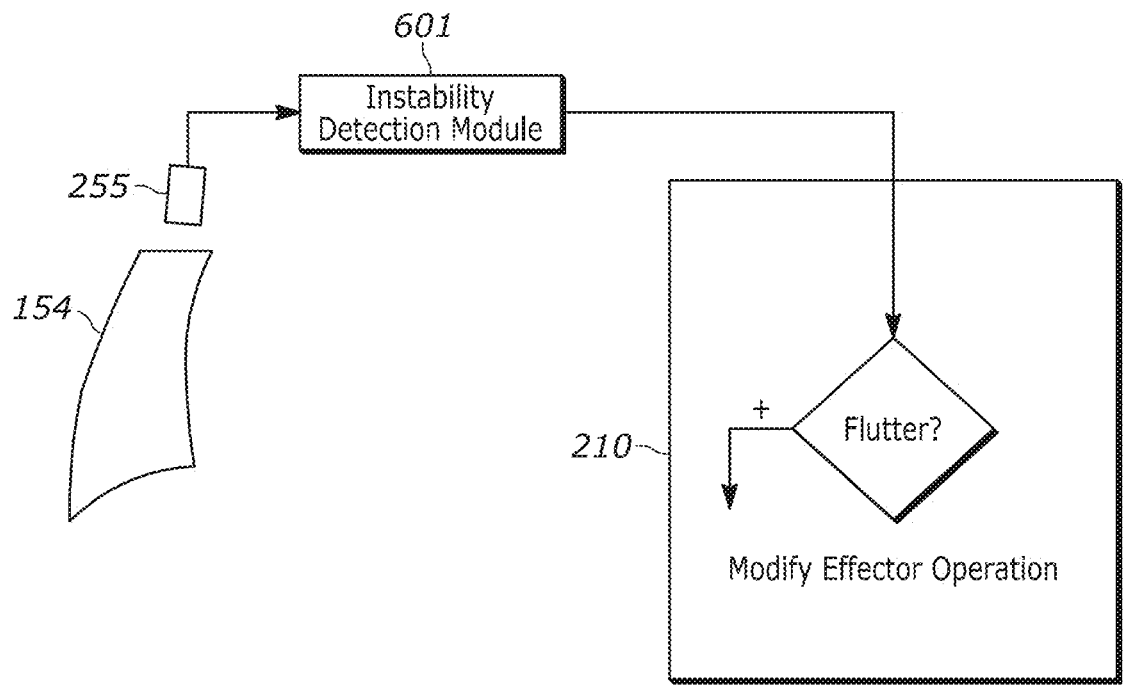
FIG. 6 is a simplified block diagram of yet another engine system according to some embodiments.

Next referring to FIG. 6, a simplified block diagram of an engine system according to some embodiments is shown. The embodiment shown in FIG. 6 is similar to the embodiment shown in FIG. 4, except that the engine includes a flutter detection module 601 configured according to the sensor type of the sensor 255. In some embodiments, the flutter detection module 601 is an added hardware module separate from the FADEC and/or be implemented as a software module of the FADEC. In some embodiments, the flutter detection module 601 performs step 320 described with reference to FIG. 3 and outputs a signal indicating the presence of an incipient instability condition to the FADEC.

Figure 7:
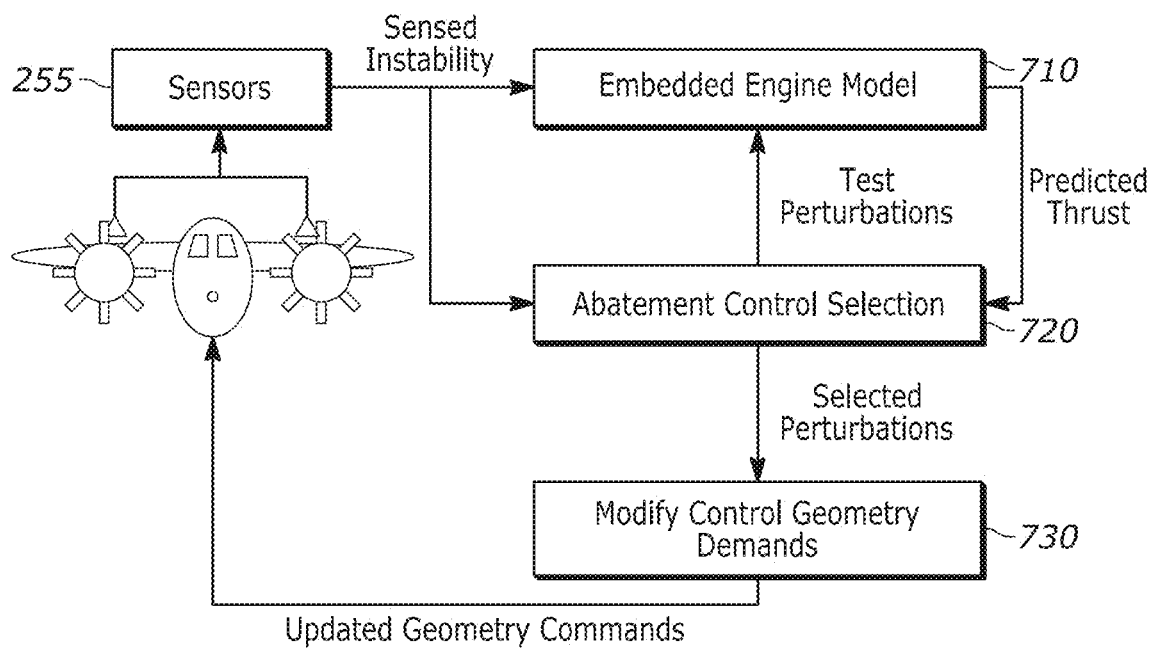
FIG. 7 is a functional block diagram for instability abatement according to some embodiments.

Next referring to FIG. 7, a flow diagram of a process of instability abatement according to some embodiments is shown. In some embodiments, one or more steps of FIG. 7 may be performed with a processor-based control system of an engine such as the engine controller 210 of the engine 100.

In FIG. 7, when an incipient instability condition or a flutter is detected by sensors 255, instability abatement control selection 720 is triggered. Multiple candidate control parameter sets, also referred to as test perturbations, may be initially selected. The perturbations are tested with an embedded engine model 710 along with flight condition data from the sensors 255 to determine the thrust associated with each perturbation. The predicted thrust is then provided back to instability abatement control selection 720. A modified control parameter set with no or the least amount of impact on thrust may be selected. The controller then modifies the control geometry demands 730 based on the selected perturbations and updates the geometry commands to engine components accordingly.

Figure 8:
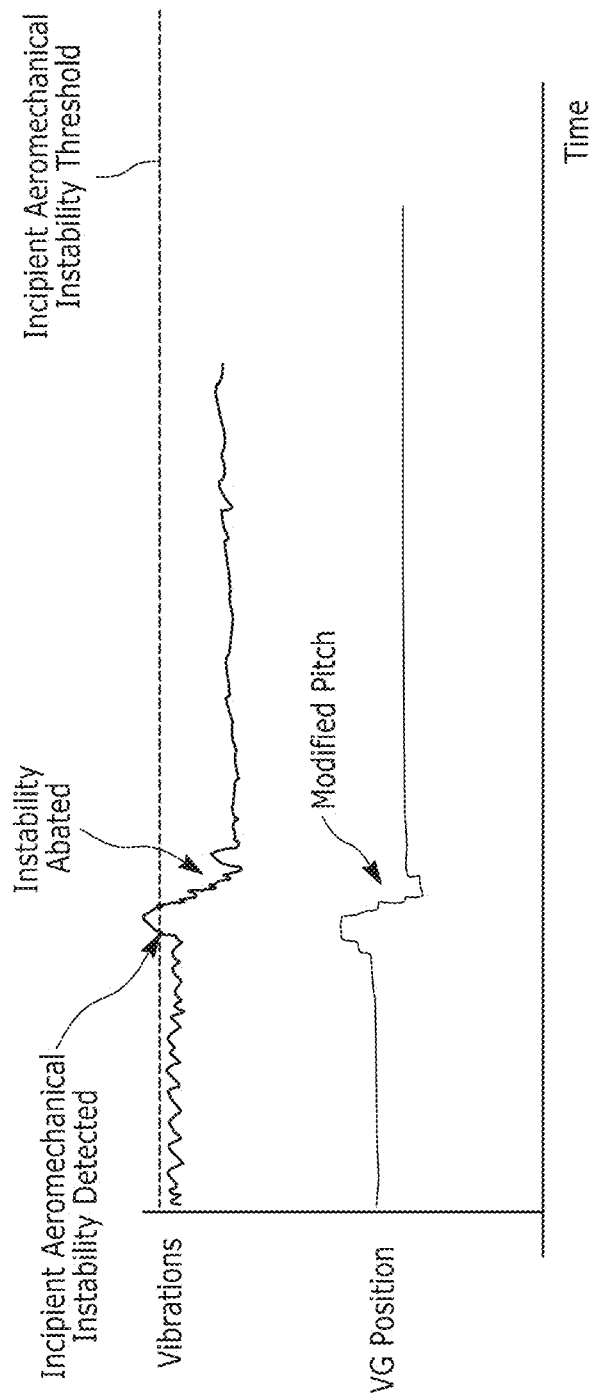
FIG. 8 is an illustration of instability abatement with vane guide position modification in accordance with some embodiments.

Next referring to FIG. 8, an illustration of instability abatement is shown. FIG. 8 is a conceptual illustration only, and the lines shown in the graph are only to show relative changes of value over time and may not correspond to actual numerical values.

FIG. 8 shows the magnitude of the vibration of one or more blades over time. The magnitude may correspond to a select frequency band. Incipient instability condition is detected when the vibration magnitude exceeds the incipient instability threshold. At that time, variable guide (VG) vane positions are modified in response. For example, the engine controller 210 may incrementally close the pitch of the VG until the vibration magnitude drops below the incipient instability threshold or another lower threshold. FIG. 8 shows the vibration magnitude returning to a level below the incipient instability threshold after the VG pitch change, indicating a successful instability abatement.

Figure 9:
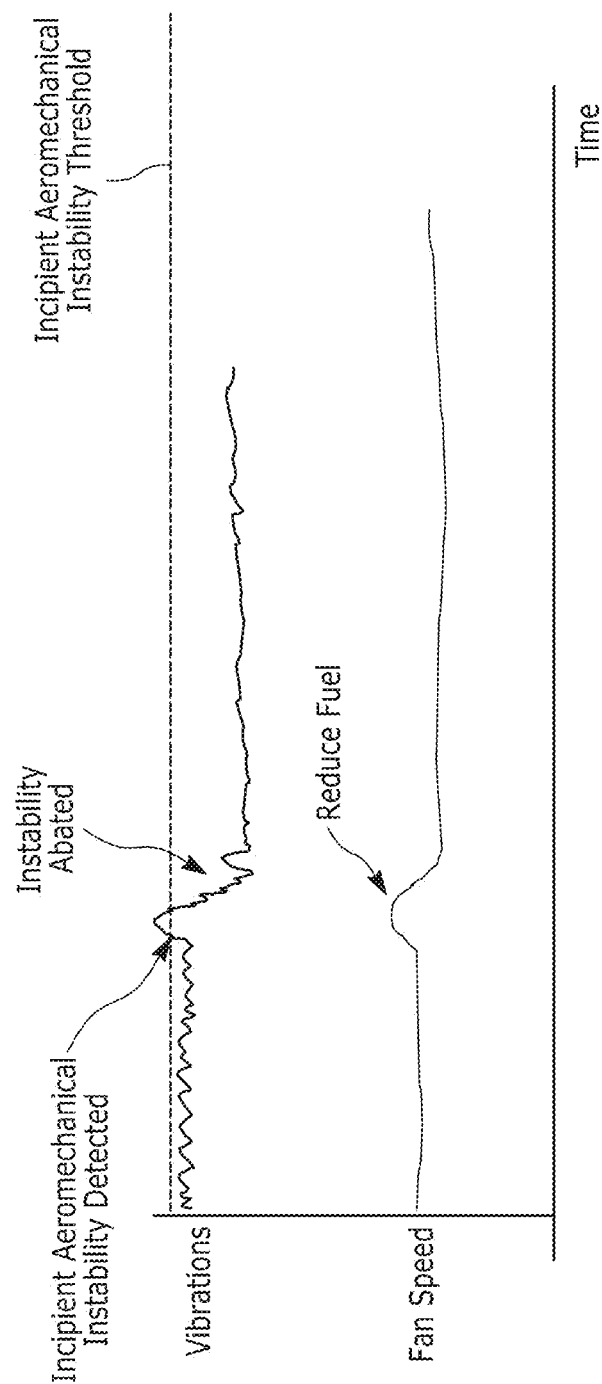
FIG. 9 is an illustration of instability abatement with fan speed modification in accordance with some embodiments.

Next referring to FIG. 9, an illustration of instability abatement is shown. FIG. 9 is a conceptual illustration only, and the lines shown in the graph are only to show relative changes of value over time and may not correspond to actual numerical values.

FIG. 9 shows the magnitude of a measured magnitude of the vibration of one or more blades over time. Incipient instability condition is detected when the vibration magnitude exceeds the incipient instability threshold. At that time, fan speed is modified in response. For example, fuel to the engine may be reduced until the vibration magnitude drops below the incipient instability threshold or another lower threshold. FIG. 9 shows the vibration magnitude returning to a level below the incipient instability threshold after the fuel reduction, indicating a successful instability abatement.

In some embodiments, an engine controller is configured to detect an incipient vibration using a vibration sensor, such as optical sensors, at a time instant sufficiently before the vibration develops into flutter. The controller processes the incipient signal to determine a magnitude based on an RMS value, real-time FFT software, or another parameter indicative of vibration magnitude. The magnitude of the incipient signal is then compared to a threshold. If the magnitude exceeds this threshold, the engine controller may incrementally close the pitch until the signal amplitude reduces sufficiently (e.g., below the threshold or a second threshold).

In some embodiments, a closed-loop control logic is implemented for instability abatement. An incipient blade deflection, which precedes an aeromechanics issue, is measured by one or more sensors such as optical sensors, strain gauges, accelerometers, and/or torque meter oscillations. In some embodiments, an accelerometer or strain gauge is embedded in the fan blades, and signals may be telemetered to the processor or transmitted using slip rings.

In some embodiments, the incipient signal is band-pass filtered to retain the relevant frequencies and filter out extraneous noise, and then processed in an A/D converter. The digitized incipient signal may then be input into an engine controller (e.g., FADEC), and a root mean square (RMS) value is computed. The RMS value is then compared against a threshold. If it exceeds the threshold, the open fan variable pitch can be commanded to close from the existing position until the incipient signal RMS value falls below the threshold. This prevents the progression of the incipient vibration into flutter.

In some embodiments, for a FADEC without an adequately high sampling rate to digitally calculate the RMS value, an analog RMS meter may be used. The output of the RMS meter is digitized with an A/D converter before being input into the FADEC. In some embodiments, instability abatement may utilize any compression component of an engine with variable geometry.

In some embodiments, a control algorithm uses onboard vibration sensors to detect the onset of blade flutter and perturbs the fan blade pitch to reduce flutter via closed-loop control. The vibration sensor may include a strain gauge sensor, torque sensor, optical sensor, etc. In some embodiments, a subsequent control algorithm is provided where, instead of sensors for control, model-based derivatives of fan blade pitch perturbations to flutter are used to schedule pitch while maintaining thrust. The impact on thrust from variable geometry perturbations for flutter mitigation may be offset using non-perturbed variable geometries. In some embodiments, the controller may prioritize eliminating flutter over preserving thrust in cases where thrust cannot be maintained without inducing flutter.

In some embodiments, instead of or in addition to fan blade pitch controls, the engine controller may control inlet guide vanes, outlet guide vanes, and/or fan speed for instability abatement. Fan speed may be controlled via fuel reduction or varying the electric load on motor-generators. A modified control architecture allows individual blades or groupings of blades to have different pitch angles for localized flutter control. Individual or groupings of inlet or outlet guide vanes can be manipulated independently for localized flutter control. Modifications made to pitch or variable geometries may be tracked as indicators of fan blade aeromechanic health.

In one example, while an aircraft is cruising at high altitude, onboard vibration sensors indicate flutter in fan blades. The engine controller uses an onboard model to predict flutter sensitivity to perturbations in pitch, guide vanes, or speed while maintaining thrust. The engine controller then updates control demand signals sent to variable geometries and/or fuel control. Subsequently, the onboard vibration sensor monitors for the successful abatement of flutter risk. After successful abatement, the engine controller may store the modified configuration for use by future instability abatements. In some embodiments, the systems and methods described herein improve aircraft stability and robustness by abating flutters in the fans.

With the system and methods described herein, an engine system may actively detect and prevent aeromechanic instability conditions such as flutter from development and improve engine safety and performance.

In some embodiments, incipient instability condition may be detected based on comparing vibration frequencies and phase differences detected by a sensor array capturing vibration data from multiple airfoils of the engine 10. For example, an engine system may detect incipient instability based on identifying system harmonic modes, on rotating or stationary parts, in real time. The system may utilize a sensor array such as dynamic strain gauges and a stream processing analytic. Digital outputs can be leveraged by engineering monitors or engine control logic to protect the engine against unstable system modes. Utilizing this method can reduce the incipient instability threshold and allow the engineering monitor or engine control logic to intervene when blade response magnitudes are lower. The systems and methods provide for increased accuracy in separating responses due to instability from benign forms of vibration, and the airflow effector control modifications can be initiated at 1-50% endurance limits based on the incipient instability detection.

Generally, system mode behavior is said to be exhibited when a set of airfoils is vibrating at a similar frequency and the phase between all airfoils in the set trends towards a consistent value. Incipient system mode behavior can be a reliable precursor for aeromechanical instability, such as flutter. In some embodiments, the sensor array may employ various types of sensors, including but not limited to strain sensors, accelerometers, and optical sensors such as lasers, for the detection of incipient aeromechanical instability.

The engine system can process a live stream of strain and/or vibration data to detect incipient instability by identifying when certain conditions are met. The first condition is the presence of a frequency lock among all instrumented airfoils, determined by whether the response is synchronous or asynchronous. Frequency lock occurs when all instrumented blades are responding at the same or substantially the same frequency. This frequency is said to be synchronous if the vibratory frequency is an integer multiple of the current rotational speed. The second condition is the presence of system mode behavior in the airfoils, determined by the phase relationship between multiple pairs of airfoils. If the response is non-synchronous and system mode behavior is present, an alert is generated. If the response is synchronous, the third condition is whether the measured nodal diameter matches the expected nodal diameter for the given rotation speed (e.g., RPM). The expected nodal diameter is a function of a blade count and synchronous engine order. If the measured nodal diameter is different from the expected nodal diameter, then an alert is generated. The alert may be sent to an engine controller and/or an aircraft controller to trigger automatic abatement and/or provide an operator warning. An example of incipient instability detection according to these conditions is described with reference to FIG. 12 herein.

The measured nodal diameter can be determined by comparing the phase relationships between unique pairs of airfoils vibrating at the same frequency with a table of theoretical phase relationships for every possible nodal diameter. The possible nodal diameters may range from −Nblade/2 to +Nblade/2, where Nblade is the number of blades in the rotor or stator set. The closest match is found by minimizing the norm between the measured and theoretical phase relationships. The measured nodal diameter is the closest neighbor in an n-dimensional phase relationship space, where n is equal to the number of sensor pairs. As will be described with reference to FIGS. 10, 11, and 13, the selection of airfoils and the location of sensors in the sensor array can impact the visibility of the nodal diameter for the purpose of nodal diameter identification.

The engine system may utilize the sensor array and methods described herein for incipient instability condition detection to reduce likelihood of failure during development test execution and/or in-flight. In some embodiments, the measured data may also be used for automated health monitoring and/or active control during the operation of the engine.

Figure 10:
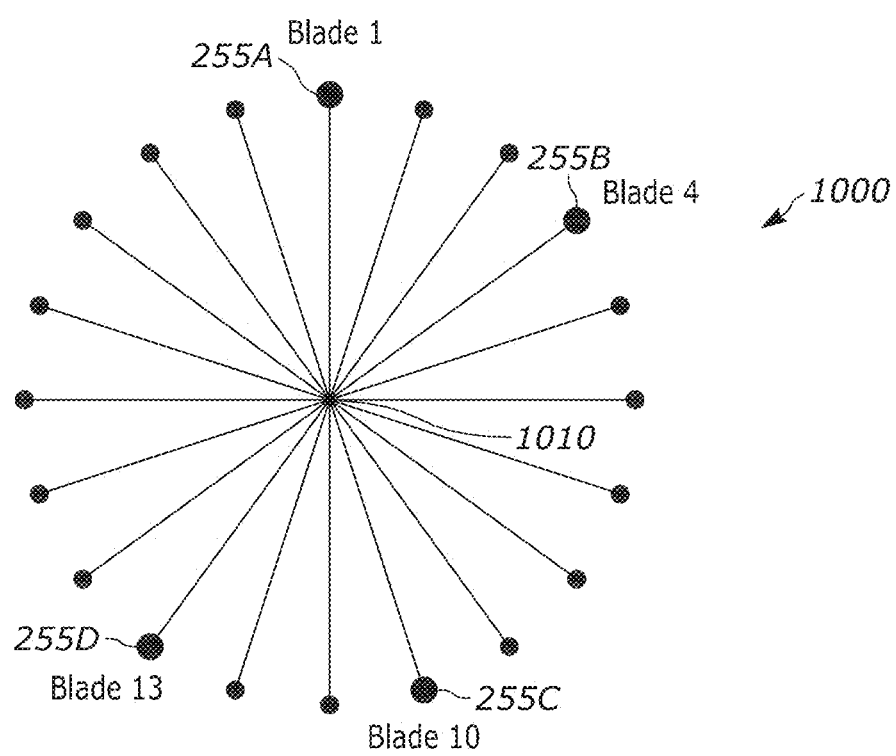
FIG. 10 is an illustration of a sensory array arrangement in accordance with some embodiments.

FIG. 10 illustrates a sensor array 1000 that may be used for incipient instability condition detection as described herein. The sensor array 1000 includes sensors 255A-D located radially outward of a center line 1010 of a fan with twenty blades with variable spacing between the sensors 255A-D. In FIG. 10, four sensors are positioned to measure vibration data from blades 1, 4, 10, and 13. In other embodiments, the number of sensors and/or the number of airfoils may vary. In some embodiments, the sensor array 1000 may include sensors mounted on a stationary airfoil, a rotating airfoil, a disc, a blisk fan blade, or a stationary part of the engine assembly for incipient instability condition detecting in these engine components. In some embodiments, the sensor array 1000 may include a plurality of spaced apart strain gauge sensors. In other embodiments, the sensor array 1000 may include light probes, capacitance probes, accelerometers, and/or dynamic kulite sensors. Generally, sensors 255A-D may be any stationary or rotating sensor devices that can capture vibration frequency and phase data from engine airfoils.

Sensors 255A-D form sensor pairs with different spacing between sensors in the pair for phase comparison and nodal diameter identification. In FIG. 10, sensors 255 A-D are positioned to capture data from blades 1, 4, 10, and 13 respectively. A first pair of sensors 255A and 225B has a first spacing (3 spaces) and a second pair of sensors 255A and 255C has a second spacing (9 space) greater than the first spacing. Sensors 255B and 255D may form a third pair having a third spacing (6 spaces) and sensors 255A and 225D may form a fourth pair having a spacing of 8. In some embodiments, none of the sensors 255A-D are radially opposite (180 degrees) each other. While a sensor array 1000 with four sensors is shown in FIG. 10, in other embodiments, a sensor array 1000 may include three, four, five, or more sensor instrumented blades, and the spacing between the pairs of sensors may differ. The airfoil and sensor configuration in FIG. 10 is shown as an example only. The sensor array 1000 may be used with devices with any number of airfoils and may include any number of sensors. Generally, spacing between the sensor pairs are selected such that as many pairs as possible have unique phase values for each theoretical nodal diameter to reduce error in nodal diameter matching.

The nodal diameter of a vibratory response refers to the number of full vibratory cycles present on the rotor at a given instant. A zero nodal diameter (0-ND) response indicates that the airfoils are completely in phase, while a 1-ND response exhibits a full 360 degrees of phase on the device. That is, the vibratory response can be represented by a sine wave, with one completely positive and one complete negative cycle visible on the rotor (i.e. half of the circumference being positive and the other half negative). As the nodal diameter increases, more vibratory cycles can be observed on the rotor. The maximum nodal diameter for a set of blades is equal to half the number of blades (NB/2). For example, a 20-bladed rotor can exhibit a maximum of 10-ND, with adjacent blades being 180 degrees out of phase.

The vibratory phase between any two instrumented airfoils can be defined as follows: Phase=ND*3600*(Blade2−Blade1)/Total Blades. For the example given above: Phase=10*360 (Blade 2−Blade 1)/20=10*360*1/20=180°. For balance concerns, sensors are often installed on blades opposite to each other. However, when sensors are positioned on blades opposite to each other such that Blade2−Blade1/Total blades=1/2, nodal diameter identification can be difficult.

In FIG. 11, a table illustrating sensor placement for nodal diameter identification in a 20-airfoil set, such as the configuration shown in FIG. 10, is shown. The phase relation between airfoils oppositely spaced (180 degrees) may be written as ND*3600*1/2=ND*180°. As shown on the fourth column, when the airfoils are opposite each other, (spacing=10), for all even nodal diameters, the phase difference is 00 and for all odd nodal diameters, the phase difference is 180°. Clear positive nodal diameter identification cannot be achieved from these locations. However, as shown in the second column, a spacing of 9 airfoils may be more favorable for nodal diameter identification. With a spacing of 9, phase relation between airfoils becomes Phase=ND*3600*9/20, which has a unique value for all possible ND values 1-10. FIG. 11 additionally shows phase values for spacing of 3 (first column) and spacing of 6 (third column), each producing unique phase difference values for each nodal diameter.

When three (or more) airfoils are instrumented, the spacing between airfoils can also be selected to yield unique phase relationship combinations for each nodal diameter. For instance, if airfoils 1, 4, and 10 are instrumented, gaps between the measured airfoils are 3, 6, and 9. Phase, 3=ND*3600*3/20 is unique for ND 1-10, Phase, 9=ND*3600*9/20 is also unique for each nodal diameter and different for each nodal diameter than what comes from the pair with a spacing of 3 airfoils. A spacing of 6 may have some repetitions, however, it still provides additional phase values for nodal diameter identification. While only one well-selected pair is necessary to positively identify the nodal diameter, as the number of instrumented airfoils increases, the number of pairs that can be used in the n-dimensional curve fit increases quadratically by Pairs=Num_blades/2*(Num_blades−1). As such, by selecting airfoil pairs with variable spacing, phase relationships can be used to effectively identify associated nodal diameter in the airfoil set.

FIG. 11 provides phase values for a 20-airfoil set, such as a 20-blade rotor, however, the same principle applies to devices with any number of airfoils. Additionally, while FIG. 11 includes phase values for spacings of 3, 9, 6, and 10, alternate spacing may be used in other embodiments. Generally, the sensor array 1000 may include sensor pairs capturing vibration data from airfoils that are not radially opposite each other to obtain unique phase values for nodal diameter identification.

Figure 13:
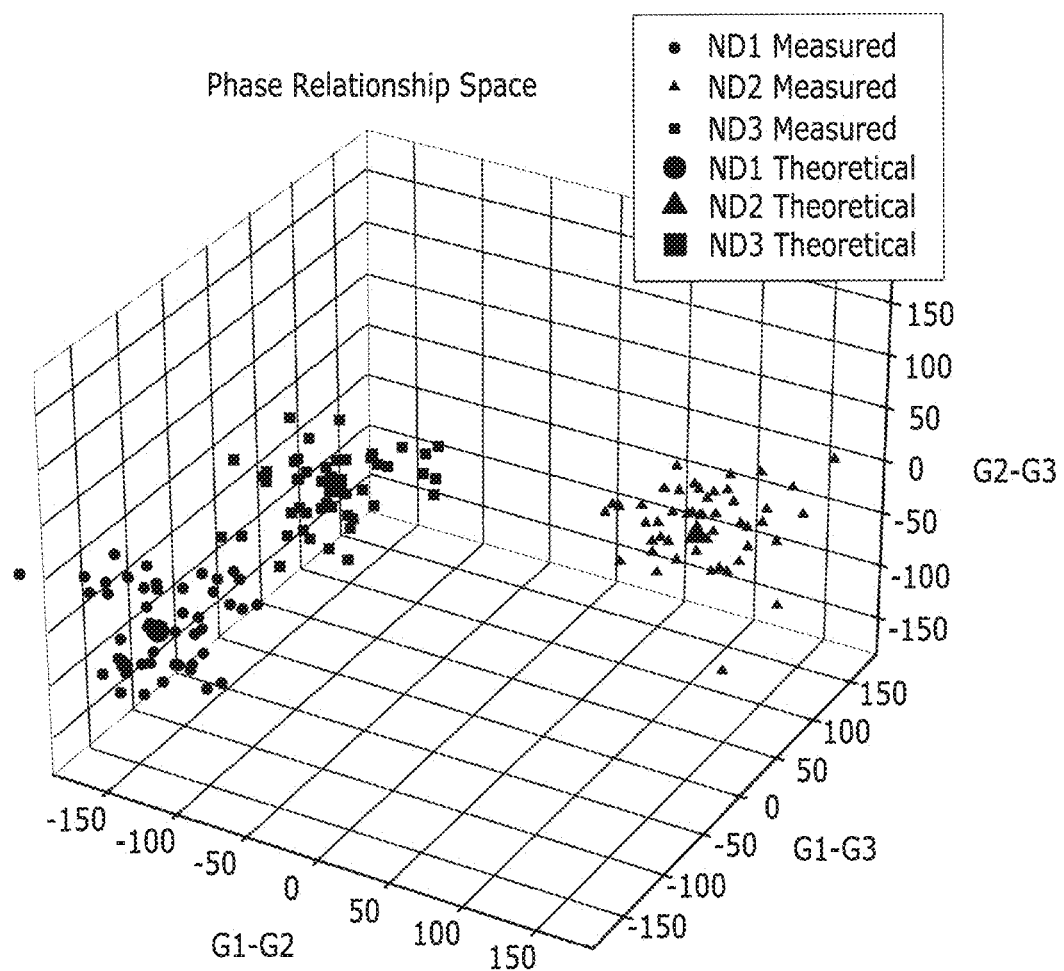
FIG. 13 is a graph depicting nodal diameter matching in accordance with some embodiments.

FIG. 13 illustrates an example of theoretical nodal diameter matching with multiple sensor pairs, depicting a 3-dimensional graph of phase relationship space for three sensors labeled G1, G2, and G3. The x-axis represents the phase relation between sensor pair G1 and G3, the y-axis represents the phase relation between sensor pair G1 and G2, and the z-axis represents the phase relation between sensor pair G2 and G3, with each axis ranging from −180 to 180 degrees. In the graph, a black circle, triangle, and square indicate the first, second, and third theoretical nodal diameters (ND1 theoretical, ND2 theoretical, and ND3 theoretical), respectively. ND1 measured, ND2 measured, and ND3 measured represent three clusters of measured phase relationships that may be matched to their respective theoretical nodal diameters.

When sensor pairs have variable spacing, theoretical nodal diameters are spaced apart in the graph, allowing phase relationships to be matched to one or more theoretical nodal diameters based on their location in the 3-dimensional graph. While a 3-dimensional graph is shown for a sensor array with 3 pairs of sensors, matching/identification can be n-dimensional, depending on the number (n) of sensor pairs in the array. The theoretical nodal diameter may be matched based on a single pair of sensors, two pairs of sensors, three pars of sensors, or four or more pairs of sensors.

Figure 12:
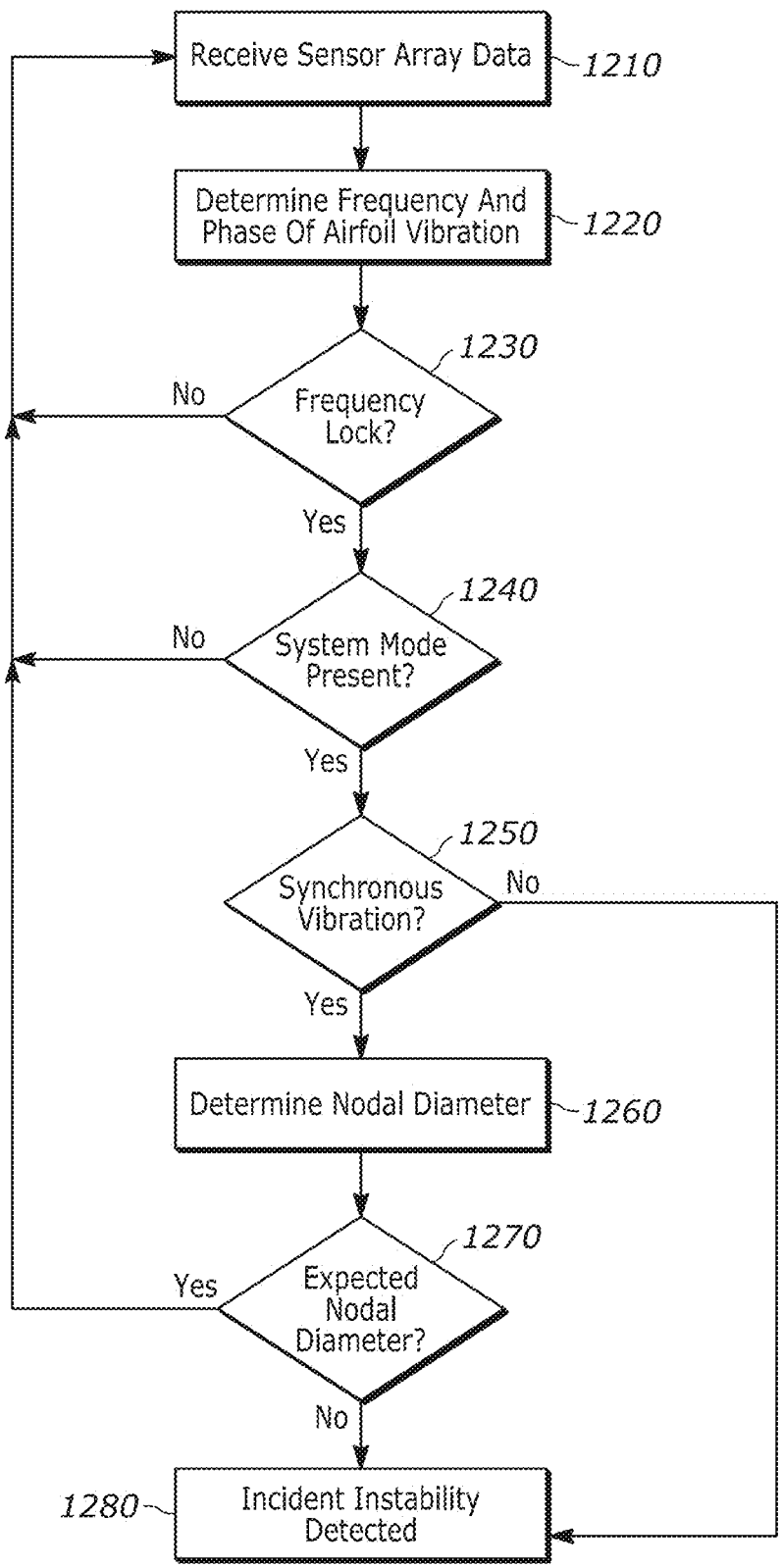
FIG. 12 is a flow diagram of a method for instability detection in accordance with some embodiments.

FIG. 12 illustrates a method for detecting incipient instability condition in an engine with a sensor array 1000. In some embodiments, one or more steps of FIG. 12 is performed with a processor-based control system of an engine such as the engine controller 210 of the engine 100. In some embodiments, for stationary airfoils such as vanes, the sensor array 1000 is stationary, and may include stationary strain gages, accelerometers, kulites sensor, laser sensors, or the like. In some embodiments, for rotating airfoils such as fan blades, the sensor array 1000 rotates with the blades, and may include rotating strain gages, accelerometers, kulite sensors, or the like.

Beginning with step 1210, the sensor array data is received from a sensor array 1000 configured to capture data from airfoils of an engine 100. In some embodiments, the airfoils may be stationary vanes or rotating blades. Sensor array data includes vibration data from two or more pairs of sensors capturing vibration frequency and phase data from corresponding airfoils.

In step 1220, frequency and phase of airfoil vibration data are determined. In some embodiments, frequency and phase information are determined via a Fast Fourier Transform (FFT) software module or FFT hardware field programmable gate array (FPGA) on-broad the engine 100. It is understood however, other methods and components may alternatively be used to determine frequency and phase of airfoil vibrations.

In step 1230, the processor determines whether frequency lock is present based on the frequencies of the captured vibration data. Frequency lock generally refers to a condition where all airfoils are vibrating at the same or substantially the same (e.g., within 0.01%, within 1%, or within 10%) frequency. If frequency lock is detected, the process continues to step 1240, otherwise, the process returns to step 1210.

In step 1240, the processor determines whether system mode is present based on a relationship between the phases of the vibrations of two or more airfoils. System mode generally refers to a normal mode condition in the system, in which airfoils of the system move sinusoidally with the same frequency and with a fixed phase relation. In step 1240, phase relationships between pairs of sensors may be compared to determine whether the phase relations are fixed. If system mode is detected, the process continues to step 1250. Otherwise, the process returns to step 1210.

In step 1250, the processor determines whether the vibrations are synchronous. Airfoil vibrations are considered synchronous when the frequency of the vibration is an integer multiple of the shaft speed of the engine assembly. If synchronous vibration is not detected, then the process continues to step 1280. If synchronous vibration is detected, the process continues to step 1260.

While steps 1230, 1240, and 1250 are shown as being sequential in FIG. 12, in some embodiments, these steps may be performed in any order and/or simultaneously. Generally, the processor may determine an incipient instability condition in step 1280 when frequency lock and system mode are both exhibited in the absence of synchronous vibration. The process may proceed to step 1260 when frequency lock, system mode, and synchronous vibration are each exhibited.

In step 1260, a nodal diameter is determined based on a measured phase relationship between one or more pairs of airfoils. In some embodiments, the measured phase relationships between pairs of sensors are compared with sets of theoretical phase relationships to identify matching theoretical nodal diameters. The matching theoretical phase relationship may be identified based on minimizing a norm between the phase relationship and the theoretical phase relationship. Example sets of theoretical nodal diameters with corresponding phase relationships are described above with reference to FIG. 11. However, values may differ depending on the number of airfoils in the system and the sensor placement. An example of a nodal diameter matching in a 3-dimensional phase relationship space is described with reference to FIG. 13 above.

Referring back to FIG. 13, in step 1270, the processor determines if the measured nodal diameters determined in step 1260 match the expected nodal diameters for the rotation speed (e.g., rotations per minute) of the engine. The expected nodal diameters for a range of rotation speeds may be stored in and retrieved from a computer readable storage memory onboard the engine. If the determined and expected nodal diameters match, then the process returns to step 1210. An expected nodal is indicative of a typical resonance response and not indicative of an instability. If the measured and expected nodal diameters do not match, then an incipient instability condition is considered present, and the process proceeds to step 1280.

In step 1280, an incipient instability is detected. In some embodiments, the engine controller 210 is configured to modify an engine control parameter in response to detecting the incipient instability for a duration of time (e.g., fraction of a second, seconds). In some embodiments, the engine control parameters may be modified as described with reference to FIG. 3. In some embodiments, the engine control parameter may be modified in response to the incipient instability condition being present for a predetermined duration of time (e.g., 2 seconds, 5 seconds, etc.). In some embodiments, the processor may be configured to generate an alert signal to an aircraft control system or a ground control system in step 1280. For example, an aircraft control system and/or a ground control system may modify current and/or future commands to the engine in response to the alert signal to prevent aeromechanical disability conditions from developing. In some embodiments, the process provided in FIG. 12 may allow for earlier detection of an instability condition compared to instability detection based solely on measuring vibration magnitude without airfoil phrase comparison. The lower detection threshold allows for instability abatement and airflow effector control changes to occur at lower response magnitude, further reducing the chance of damage and engine failure.

In some embodiments, the processor may further detect a damage condition based on the magnitudes and durations of the vibrations measured by the sensor array 1000 and to output a damage alert signal in response to detecting the damage condition. For example, damage condition may be detected when the vibration exceeds a threshold magnitude for a threshold duration. In some embodiments, responses in excess of 100% of endurance limit may represent a damage condition. The threshold values may depend on engine configuration and model, and may be determined based on testing or simulation. In some embodiments, the processor may record instances of damage conditions in a memory storage, determine an engine health status based on accumulated instances of damage conditions, and output a maintenance alert signal based on the engine health status.

The systems and methods described herein may autonomously detect and counteract incipient instability conditions, such as flutter, which present considerable structural and safety hazards. The detection methodologies employed provide an early warning of potential instability conditions, facilitating the implementation of preemptive measures. Upon the identification of instabilities, the system may further be configured to ascertain and implement modified control parameters for airflow effector devices, diverging from the standard schedule to forestall or mitigate flutters. The incorporation of these features enhances the overall safety, efficiency, and dependability of aircraft engines by offering an improved method for the detection and neutralization of aeromechanical instabilities. Further aspects of the disclosure are provided by the subject matter of the following clauses:

An engine system including an engine controller communicatively coupled to a sensor and a airflow effector device, the engine controller is configured to: control the airflow effector device according to a nominal schedule; detect, based on a signal from a sensor indicating a vibration amplitude of the rotating blades within a frequency band, an incipient instability condition; in response to the incipient instability condition being present, determine a modified control parameter for at least one of the airflow effector device; and control the at least one of the airflow effector device according to the modified control parameter, deviating from the nominal schedule.

An engine system including: a sensor configured to capture a data from rotating blades of the engine system; an airflow effector device; and an engine controller communicatively coupled to the sensor and the airflow effector device, the engine controller is configured to: control the airflow effector device according to a nominal schedule; detect, based on a signal from the sensor indicating a vibration amplitude of the rotating blades within a frequency band, an incipient instability condition; in response to the incipient instability condition being present, determine a modified control parameter for at least one of the airflow effector device; control the at least one of the airflow effector device according to the modified control parameter, deviating from the nominal schedule.

The engine system of any of the preceding clauses, wherein the sensor includes at least one of an optical sensor, a pressure transducer sensor, a strain gauge, an accelerometer, or a torque meter for detecting oscillation frequencies.

The engine system of any of the preceding clauses, wherein the sensor includes a blade pass sensor for detecting times or arrival of blades.

The engine system of any of the preceding clauses, wherein the blade pass sensor includes an optical sensor, a capacitance sensor, and/or an eddy current sensor.

The engine system of any of the preceding clauses, wherein the sensor includes a rotating sensor that is mounted on and rotates with the rotating blades of the engine system.

The engine system of any of the preceding clauses, wherein the incipient instability condition is detected based on an amplitude magnitude in a predetermined frequency band of the signal from the sensor exceeding a threshold value.

The engine system of any of the preceding clauses, wherein the incipient instability condition is detected based on a root mean square (RMS) value of the signal from the sensor exceeding a threshold value.

The engine system of any of the preceding clauses, further including an analog RMS meter for computing the RMS value and providing the RMS value to the engine controller.

The engine system of any of the preceding clauses, wherein the sensor includes a stationary sensor, and the incipient instability condition is detected by shifting a frequency measured based on the signal from the sensor by a product of a system mode nodal diameter and an engine speed.

The engine system of any of the preceding clauses, wherein the sensor includes a stationary sensor, and the incipient instability condition is detected based on the amplitude of a predetermined frequency band, shifted by the product of a system mode nodal diameter and an engine speed, exceeding a threshold value.

The engine system of any of the preceding clauses, wherein, in response to detecting the incipient instability condition, the engine controller is configured to incrementally close a pitch angle of one or more rotating blades or stationary vanes of the engine system.

The engine system of any of the preceding clauses, further including a memory storage device storing a control parameter table storing modified control parameters corresponding to one or more engine parameters, wherein the modified control parameter is determined based on the control parameter table.

The engine system of any of the preceding clauses, wherein the one or more engine parameters include a target thrust, a target speed, control parameters of the nominal schedule, and/or signals from one or more engine, flight, or environmental sensors.

The engine system of any of the preceding clauses, further including a memory storage device storing an engine model, wherein the modified control parameter is selected from candidate control parameters based on using the engine model to predict thrust for each candidate control parameters.

The engine system of any of the preceding clauses, wherein the airflow effector device includes a blade pitch change mechanism configured to change pitch angles of the rotating blades of the engine system; and wherein the modified control parameter includes a change in the pitch angles of one or more of the rotating blades.

The engine system of any of the preceding clauses, wherein the modified control parameter changes the pitch angles of only a subset of the rotating blades while others of the rotating blades are pitched according to the nominal schedule.

The engine system of any of the preceding clauses, wherein the airflow effector device include one or more vane pitch changing mechanisms configured to change pitch angles of inlet guide vanes and/or outlet guide vanes, and the modified control parameter includes a change in the pitch angles of one or more of the vanes.

The engine system of any of the preceding clauses, wherein the modified control parameter changes the pitch angles of only a subset of the outlet guide vanes while others of the vanes are pitched according to the nominal schedule.

The engine system of any of the preceding clauses, wherein the engine controller is further configured to store the modified control parameter for engine health analysis.

The engine system of any of the preceding clauses, wherein the airflow effector device include a fuel injector and/or an electric fan motor, and the modified control parameter includes a modified blade rotation speed.

The engine system of any of the preceding clauses, wherein the engine controller is further configured to determine one or more sets of subsequent modified control parameters and control the airflow effector device according to the one or more sets of subsequent modified control parameters until the incipient instability condition ends.

The engine system of any of the preceding clauses, wherein the engine controller is further configured to: detect an end of the incipient instability condition based on the signal from the sensor; and control the airflow effector device according to the nominal schedule in response to detecting the end of the incipient instability condition.

The engine system of any of the preceding clauses, wherein the engine controller includes a full authority digital engine control (FADEC) of the engine system and the nominal schedule is determined based on a target thrust determined based on an engine command from an aircraft controller.

The engine system of any of the preceding clauses, wherein the frequency band is determined based on simulation or inflight measurements of another engine.

The engine system of any of the preceding clauses, wherein the engine system is an open fan turbine engine.

A method for controlling an engine system including: controlling, from an engine controller, an airflow effector device of the engine system according to a nominal schedule; detecting, based on a signal from a sensor capturing data from rotating blades of the engine system, an incipient instability condition, wherein the signal indicates a vibration amplitude of the rotating blades within a frequency band; in response to the incipient instability condition being present, determining a modified control parameter for at least one of the airflow effector device; and controlling the airflow effector device according to the modified control parameter, deviating from the nominal schedule; wherein the sensor includes at least one of an optical sensor, a pressure transducer sensor, a strain gauge, an accelerometer, or a torque meter for detecting oscillation frequencies; wherein the airflow effector device include at least one of a plurality of variable pitch blades, a fuel injector, a plurality of variable stator vanes, a plurality of inlet guide vanes, a plurality of outlet guide vanes, a variable nozzle, or an electric motor; and wherein the modified control parameter includes changes in at least one of blade pitch angle, inlet guide vane pitch angle, outlet guide vane pitch angle, or fan speed.

A method for controlling an engine system including: controlling, from an engine controller, an airflow effector device of the engine system according to a nominal schedule; detecting, based on a signal from a sensor capturing data from rotating blades of the engine system, an incipient instability condition, wherein the signal indicates a vibration amplitude of the rotating blades within a frequency band; in response to the incipient instability condition being present, determining a modified control parameter for at least one of the airflow effector device; and controlling the at least one of the airflow effector device according to the modified control parameter, deviating from the nominal schedule.

A method for instability detection in an engine system, including: receiving, at an engine controller, signals from a sensor array positioned to measure vibrations of two or more airfoils of an engine assembly; determining, by the engine controller, frequencies and phases of the vibrations of the two or more airfoils based on the signals from the sensor array; detecting, by the engine controller, an incipient instability condition based on the frequencies and the phases of the vibrations of the two or more airfoils; and output, from the engine controller, an instability alert signal in response to detecting the incipient instability condition.

The method of any of the preceding clauses, wherein the sensor includes at least one of an optical sensor, a pressure transducer sensor, a strain gauge, an accelerometer, or a torque meter for detecting oscillation frequencies.

The method of any of the preceding clauses, wherein the sensor includes a blade pass sensor for detecting times or arrival of blades.

The method of any of the preceding clauses, wherein the blade pass sensor includes an optical sensor, a capacitance sensor, and/or an eddy current sensor.

The method of any of the preceding clauses, wherein the sensor includes a rotating sensor that is mounted on and rotates with the rotating blades of the engine system.

The method of any of the preceding clauses, wherein the incipient instability condition is detected based on an amplitude magnitude in a predetermined frequency band of the signal from the sensor exceeding a threshold value.

The method of any of the preceding clauses, wherein the incipient instability condition is detected based on a root mean square (RMS) value of the signal from the sensor exceeding a threshold value.

The method of the preceding clauses, further including an analog RMS meter for computing the RMS value and providing the RMS value to the engine controller.

The method of any of the preceding clauses, wherein the sensor includes a stationary sensor, and the incipient instability condition is detected by shifting a frequency measured based on the signal from the sensor by a product of a system mode nodal diameter and an engine speed.

The method of any of the preceding clauses, wherein the sensor includes a stationary sensor, and the incipient instability condition is detected based on the amplitude of a predetermined frequency band, shifted by the product of a system mode nodal diameter and an engine speed, exceeding a threshold value."

The method of any of the preceding clauses, wherein, in response to detecting the incipient instability condition, the engine controller is configured to incrementally close a pitch angle of one or more rotating blades or stationary vanes of the engine system.

The method of any of the preceding clauses, further including a memory storage device storing a control parameter table storing modified control parameters corresponding to one or more engine parameters, wherein the modified control parameter is determined based on the control parameter table.

The method of any of the preceding clauses, wherein the one or more engine parameters include a target thrust, a target speed, control parameters of the nominal schedule, and/or signals from one or more engine, flight, or environmental sensors.

The method of any of the preceding clauses, further including a memory storage device storing an engine model, wherein the modified control parameter is selected from candidate control parameters based on using the engine model to predict thrust for each candidate control parameters.

The method of any of the preceding clauses, wherein the airflow effector device includes a blade pitch change mechanism configured to change pitch angles of the rotating blades of the engine system; and wherein the modified control parameter includes a change in the pitch angles of one or more of the rotating blades.

The method of any of the preceding clauses, wherein the modified control parameter changes the pitch angles of only a subset of the rotating blades while others of the rotating blades are pitched according to the nominal schedule.

The method of any of the preceding clauses, wherein the airflow effector device include one or more vane pitch changing mechanisms configured to change pitch angles of inlet guide vanes and/or outlet guide vanes, and the modified control parameter includes a change in the pitch angles of one or more of the vanes.

The method of any of the preceding clauses, wherein the modified control parameter changes the pitch angles of only a subset of the outlet guide vanes while others of the vanes are pitched according to the nominal schedule.

The method of any of the preceding clauses, wherein the engine controller is further configured to store the modified control parameter for engine health analysis.

The method of any of the preceding clauses, wherein the airflow effector device include a fuel injector and/or an electric fan motor, and the modified control parameter includes a modified blade rotation speed.

The method of any of the preceding clauses, wherein the engine controller is further configured to determine one or more sets of subsequent modified control parameters and control the airflow effector device according to the one or more sets of subsequent modified control parameters until the incipient instability condition ends.

The method of any of the preceding clauses, wherein the engine controller is further configured to: detect an end of the incipient instability condition based on the signal from the sensor; and initiate returning the airflow effector device to the nominal schedule in response to detecting the end of the incipient instability condition.

The method of any of the preceding clauses, wherein the engine controller includes a full authority digital engine control (FADEC) of the engine system and the nominal schedule is determined based on a target thrust determined based on an engine command from an aircraft controller.

The method of any of the preceding clauses, wherein the engine system is an open fan turbine engine.

An engine system is provided, including: a plurality of flow path airfoils of an engine assembly; a sensor array positioned to measure vibrations of two or more airfoils of the plurality of flow path airfoils; and an engine controller communicatively coupled to the sensor array, the engine controller is configured to: determine frequencies and phases of the vibrations of the two or more airfoils based on signals from the sensor array; detect an incipient instability condition based on the frequencies and the phases of the vibrations of the two or more airfoils; and output an instability alert signal in response to detecting the incipient instability condition.

The engine of any of the preceding clauses, wherein the engine controller is further configured to modify an engine control parameter in response to detecting the incipient instability condition.

The engine of any of the preceding clauses, wherein the engine control parameter includes a change in a pitch of a variable pitch blade or a variable pitch vane.

The engine of any of the preceding clauses, wherein the engine control parameter is modified in response to the incipient instability condition being present for a predetermined duration of time.

The engine of any of the preceding clauses, wherein the engine controller is further configured: detect a damage condition based on magnitudes and durations of the vibrations measured by the sensor array; output a damage alert signal in response to detecting the damage condition.

The engine of any of the preceding clauses, wherein the engine controller is further configured to: record instances of damage conditions in a memory storage; determine an engine health status based on accumulated instances of damage conditions; and output a maintenance alert signal based on the engine health status.

The engine of any of the preceding clauses, wherein the sensor array includes a plurality of spaced apart strain gauge sensors.

The engine of any of the preceding clauses, wherein the sensor array includes light probes, capacitance probes, accelerometers, or dynamic kulite sensors.

The engine of any of the preceding clauses, wherein the sensor array includes at least one sensor mounted on a stationary airfoil, a rotating airfoil, a disc, a blisk fan blade, or a stationary part of the engine assembly.

The engine of any of the preceding clauses, wherein the plurality of flow path airfoils includes rotating or stationary airfoils of the engine assembly.

The engine of any of the preceding clauses, wherein the sensor array includes sensors located radially outward of a center line of the engine assembly with variable spacing between the sensors.

The engine of any of the preceding clauses, wherein the sensor array includes a first pair of sensors having a first spacing and a second pair of sensors having a second spacing greater than the first spacing.

The engine of any of the preceding clauses, where the engine controller is configured to: detect a frequency lock in the vibrations of the two or more airfoils; and determine whether the vibrations are synchronous.

The engine of any of the preceding clauses, wherein the vibrations are synchronous when the frequency of a vibration is an integer multiple of a shaft speed of the engine assembly.

The engine of any of the preceding clauses, wherein the engine controller is further configured to detect a presence of a system mode based on a relationship between the phases of the vibrations of the two or more airfoils.

The engine of any of the preceding clauses, wherein the incipient instability condition is detected when the frequency lock and the system mode are present, and the vibrations are non-synchronous.

The engine of any of the preceding clauses, wherein in the event that the vibrations are synchronous, the engine controller is further configured to compare a nodal diameter of the system mode to an expected nodal diameter associated with a blade count of the plurality of flow path airfoils and the integer multiple of shaft speed that represents the synchronous response, and wherein the incipient instability condition is detected when the nodal diameter of the system mode does not match the expected nodal diameter.

The engine of any of the preceding clauses, wherein the nodal diameter of is determined based on: determining a phase relationship between at least one pair of airfoils in the two or more airfoils; and comparing the phase relationship with a table of theoretical phase relationships and corresponding theoretical nodal diameters to identify a matching theoretical phase relationship.

The engine of any of the preceding clauses, wherein the matching theoretical phase relationship is identified based on minimizing a norm between the phase relationship and the theoretical phase relationships.

The engine of any of the preceding clauses, wherein the sensor array includes n pairs of sensors and the nodal diameter is a theoretical nodal diameter that is the closest neighbor in an n-dimensional phase relationship space.

The engine of any of the preceding clauses, wherein the frequencies and phases of the vibrations are determined by a Fast Fourier transform (FFT) via a software module or a hardware field programmable gate array (FPGA).

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The invention claimed is:

1. An engine system comprising:
    a sensor configured to capture data from rotating blades of the engine system;
    an airflow effector device;
    a memory storage device storing an engine model; and
    an engine controller communicatively coupled to the sensor and the airflow effector device, the engine controller is configured to:
        control the airflow effector device according to a nominal schedule;
        detect, based on a signal from the sensor indicating a vibration amplitude of the rotating blades within a frequency band, an incipient instability condition;

in response to the incipient instability condition being present, determine a modified control parameter for the airflow effector device; and
control the airflow effector device according to the modified control parameter, deviating from the nominal schedule;
wherein the modified control parameter is selected from among sets of candidate control parameters based on:
using the engine model to predict thrust for the sets of candidate control parameters; and
selecting a set of candidate control parameters that maintains the thrust or causes a least amount of reduction to the thrust.

2. The engine system of claim 1, wherein the sensor comprises one or more of an optical sensor, a pressure transducer sensor, a strain gauge, an accelerometer, a capacitance sensor, an eddy current sensor, or a torque meter for detecting oscillation frequencies.

3. The engine system of claim 1, wherein the sensor comprises a blade pass sensor for detecting times of arrival of blades.

4. The engine system of claim 1, wherein the sensor comprises a rotating sensor that is mounted on and rotates with the rotating blades of the engine system.

5. The engine system of claim 1, wherein the incipient instability condition is detected based on an amplitude magnitude in a predetermined frequency band of the signal from the sensor exceeding a threshold value.

6. The engine system of claim 1, wherein the incipient instability condition is detected based on a root mean square (RMS) value of the signal from the sensor exceeding a threshold value.

7. The engine system of claim 6, further comprising an analog RMS meter for computing the RMS value and providing the RMS value to the engine controller.

8. The engine system of claim 1, wherein, in response to detecting the incipient instability condition, the engine controller is configured to incrementally close a pitch angle of one or more of the rotating blades or stationary vanes of the engine system.

9. The engine system of claim 1, wherein the memory storage device stores a control parameter table storing modified control parameters corresponding to one or more engine parameters, wherein the modified control parameter is determined based on the control parameter table.

10. The engine system of claim 9, wherein the one or more engine parameters comprise one or more of a target thrust, a target speed, control parameters of the nominal schedule, or signals from one or more engine, flight, or environmental sensors.

11. The engine system of claim 1, wherein the airflow effector device comprises a blade pitch change mechanism configured to change pitch angles of the rotating blades of the engine system; and wherein the modified control parameter comprises a change in the pitch angles of one or more of the rotating blades.

12. The engine system of claim 1, wherein the frequency band is determined based on simulation or inflight measurements of another engine.

13. The engine system of claim 1, wherein the engine controller is further configured to determine one or more sets of subsequent modified control parameters and control the airflow effector device according to the one or more sets of subsequent modified control parameters until the incipient instability condition ends.

14. The engine system of claim 1, wherein the engine controller is further configured to:
detect an end of the incipient instability condition based on the signal from the sensor; and
control the airflow effector device according to the nominal schedule in response to detecting the end of the incipient instability condition.

15. The engine system of claim 1, wherein the engine controller comprises a full authority digital engine control (FADEC) of the engine system and the nominal schedule is determined based on a target thrust determined based on an engine command from an aircraft controller.

16. An engine system comprising:
a sensor configured to capture data from rotating blades of the engine system;
an airflow effector device; and
an engine controller communicatively coupled to the sensor and the airflow effector device, the engine controller is configured to:
control the airflow effector device according to a control parameter of a nominal schedule;
detect, based on a signal from the sensor indicating a vibration amplitude of the rotating blades within a frequency band, an incipient instability condition;
in response to the incipient instability condition being present, determine a modified control parameter for the airflow effector device; and
control the airflow effector device according to the modified control parameter, deviating from the nominal schedule;
wherein the sensor comprises a stationary sensor, and the incipient instability condition is detected by shifting a frequency measured based on the signal from the sensor by a product of a system mode nodal diameter and an engine speed.

17. An engine system comprising:
a sensor configured to capture data from rotating blades of the engine system;
an airflow effector device; and
an engine controller communicatively coupled to the sensor and the airflow effector device, the engine controller is configured to:
control the airflow effector device according to control parameters of a nominal schedule;
detect, based on a signal from the sensor indicating a vibration amplitude of the rotating blades within a frequency band, an incipient instability condition;
in response to the incipient instability condition being present, determine a modified control parameter for the airflow effector device; and
control the airflow effector device according to the modified control parameter, deviating from the nominal schedule;
wherein the airflow effector device comprises one or more vane pitch changing mechanisms configured to change pitch angles of one or more of inlet guide vanes or outlet guide vanes, and the modified control parameter comprises a change in the pitch angles of the one or more of the inlet guide vanes or the outlet guide vanes;
wherein the modified control parameter changes the pitch angles of only a subset of the outlet guide vanes while others of the outlet guide vanes are pitched according to the nominal schedule.

18. A method for controlling an engine system comprising:
controlling, from an engine controller, one or more airflow effector devices of the engine system according to a nominal schedule;

detecting, based on a signal from a sensor capturing data from rotating blades of the engine system, an incipient instability condition, wherein the signal indicates a vibration amplitude of the rotating blades within a frequency band;

in response to the incipient instability condition being present, determining a modified control parameter for at least one of the one or more airflow effector devices; and controlling the at least one of the one or more airflow effector devices according to the modified control parameter, deviating from the nominal schedule;

wherein the modified control parameter is selected from among sets of candidate control parameters based on:
  using an engine model to predict thrust for the sets of candidate control parameters; and
  selecting a set of candidate control parameters that maintains the thrust or causes a least amount of reduction to the thrust.

* * * * *